US010520098B2

(12) United States Patent
Miyashita et al.

(10) Patent No.: US 10,520,098 B2
(45) Date of Patent: Dec. 31, 2019

(54) BUTTERFLY-VALVE SEAT RING AND FIXING STRUCTURE OF THE SAME, AND ECCENTRIC-TYPE BUTTERFLY VALVE

(71) Applicant: KITZ CORPORATION, Chiba (JP)

(72) Inventors: Yukihiro Miyashita, Nagano (JP); Kazunori Sakyu, Nagano (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 15/515,811

(22) PCT Filed: Oct. 6, 2015

(86) PCT No.: PCT/JP2015/078298
§ 371 (c)(1),
(2) Date: Mar. 30, 2017

(87) PCT Pub. No.: WO2016/056535
PCT Pub. Date: Apr. 14, 2016

(65) Prior Publication Data
US 2017/0299065 A1    Oct. 19, 2017

(30) Foreign Application Priority Data

Oct. 7, 2014  (JP) ................. 2014-206773
Oct. 7, 2014  (JP) ................. 2014-206774
Apr. 8, 2015  (JP) ................. 2015-079402

(51) Int. Cl.
*F16K 1/226* (2006.01)
*F16K 1/42* (2006.01)

(52) U.S. Cl.
CPC .............. *F16K 1/2263* (2013.01); *F16K 1/42* (2013.01); *F16K 1/226* (2013.01)

(58) Field of Classification Search
CPC ........... F16K 1/226; F16K 1/2263; F16K 1/42
See application file for complete search history.

(56) References Cited

U.S. PATENT DOCUMENTS 1,708,256 A  *  4/1929  Burnham ................. F16J 9/063
                                                        277/485
4,210,313 A  *  7/1980  Chester ................. F16K 1/2263
                                                        251/173
(Continued)

FOREIGN PATENT DOCUMENTS

EP    2 336 612      6/2011
JP    55-82558       12/1978
(Continued)

OTHER PUBLICATIONS

International Search Report dated Dec. 22, 2015 in International Application No. PCT/JP2015/078298.

*Primary Examiner* — Kevin F Murphy
*Assistant Examiner* — Christopher D Ballman
(74) *Attorney, Agent, or Firm* — Wenderoth, Lind & Ponack, L.L.P.

(57) ABSTRACT

A butterfly-valve seat ring and fixing structure of the same, and an eccentric-type butterfly valve in which, the butterfly-valve seat ring has a flexible part (31) with a predetermined material thickness integrally and extendedly provided on one side surface of an inner diameter of a ring-shaped base body part (30) having a substantially rectangular shape in section and has a fixing part (32) integrally and extendedly provided on one side surface of an outer diameter of the base body part, has a recessed-shaped space part (40) provided between an outer circumferential surface (36) of the flexible part and an inner circumferential surface (37) of the fixing part, and has a seal contact part (35) provided to project at an inner diameter position of the flexible part. The seal contact part is positioned on an inner circumferential surface of the flexible part rather than a depth-side position of the space part.

3 Claims, 11 Drawing Sheets

(56) References Cited

U.S. PATENT DOCUMENTS

| | | | | | |
|---|---|---|---|---|---|
| 4,410,163 | A | * | 10/1983 | Scobie | F16K 1/2263 251/306 |
| 4,513,765 | A | * | 4/1985 | Rishovd | F16K 1/2263 137/72 |
| 4,593,916 | A | * | 6/1986 | Laulhe | F16K 1/226 251/306 |
| 4,813,650 | A | * | 3/1989 | Dingler | F16K 1/2263 251/306 |
| 5,357,997 | A | * | 10/1994 | Brueggestrath | F16K 1/2263 137/15.25 |
| 6,494,466 | B1 | * | 12/2002 | Hartman | F16J 15/025 251/305 |
| 2003/0062500 | A1 | * | 4/2003 | Eggleston | F16K 1/222 251/306 |
| 2012/0273708 | A1 | * | 11/2012 | Kim | F16K 1/2263 251/306 |

FOREIGN PATENT DOCUMENTS

| | | |
|---|---|---|
| JP | 5-10457 | 1/1993 |
| JP | 2000-199571 | 7/2000 |
| JP | 2003-130236 | 5/2003 |
| JP | 4327217 | 9/2009 |

* cited by examiner

BUTTERFLY-VALVE SEAT RING AND FIXING STRUCTURE OF THE SAME, AND ECCENTRIC-TYPE BUTTERFLY VALVE

TECHNICAL FIELD

The present invention relates to, in particular, a butterfly-valve seat ring and fixing structure of the same, and eccentric-type butterfly valve suitable for high-pressure fluid.

BACKGROUND ART

Conventionally, in particular, as a valve suitable for a high-pressure fluid, an eccentric-type butterfly valve has been generally known. For example, in a double-eccentric-type butterfly valve, a valve shaft is provided to be eccentric to a flow path side with respect to a valve body, a virtual cone is provided from a predetermined point on a center line of a flow path toward the outer circumference of the valve body, and a contact surface on this cone with the valve body serves as a seal surface of a fluororesin-made seat ring. Even at the time of high pressure, sealability at the time of valve closing is enhanced more than a central-type butterfly valve. A seat ring for use in this eccentric-type butterfly valve is normally formed of fluororesin, which is a heat-resistant material, so as to be able to resist even a high-temperature fluid. Since fluororesin has a low elastic force compared with normal resin materials, fluororesin is formed into a special shape to improve the elastic force and enhance sealability with the valve body.

As an eccentric-type butterfly valve of this type, for example, a butterfly valve of PTL 1 has been disclosed. In this butterfly valve, a seat ring is made of synthetic rubber or fluororesin, and is fixed between a valve main body and a retainer with screws. On a retainer side of the seat ring, an inner end of the seat ring is in contact with a valve body for close contact, and a recessed part is formed to absorb a bulge at the time of distortion.

In an eccentric butterfly valve of PTL 2, in a schematic diagram of FIG. 11, a seat ring 1 is formed of an annular body in a flat plate shape. On one surface of this annular body, an annular groove 2 is provided by drilling concentrically with the annular ring. With this, the inner circumferential surface is formed in a convex shape in section, and a seal surface part 3 with respect to a valve body is provided. The annular groove 2 is provided so that its groove bottom 4 is present in an area E between a curved surface B formed by a line passing through a contact point A between the seal surface part 3 and the valve body and perpendicular to the outer circumferential surface of the valve body and a parallel plane C passing through the above-mentioned contact point A and parallel to a front surface. The seat ring 1 is divided into an outer half part 5 lower than a broken line in the drawing and an inner half part 6 upper than the broken line by taking the annular groove 2 as a boundary. The outer half part 5 fits in the recessed portion provided by drilling a valve main body, and is pressed by a retainer to be fixed to the valve main body. The inner half part 6 is given flexibility by the annular groove 2, and is provided so as to be sealable with the valve body.

PTL 3 suggests an eccentric-type butterfly valve in a structure in which a flowing direction is restricted to one direction and sealing is made in a direction in which operation torque increases with an increase in fluid pressure. In this eccentric-type butterfly valve, a groove part fixed by fitting in a protruding part provided to a retainer is provided on one surface side of an annular seat ring, and is provided as a flat shape so as to be able to catch both surfaces including this surface. In a state in which both of the entire flat surfaces abut on the retainer and a body from the groove part to a fixing part on an outer circumferential side, the seat ring is fixed as being caught by these. A seal surface of the seat ring is formed in a shape approximately identical to that of a spherical surface region on a seal side of a disc, and this seal surface has a seal width provided to have a dimension approximately equal to that of the sheet thickness of the seat ring. Thus, at the time of valve closing, sealing is made by a wide abutting surface between the seat ring and the disc.

In a seat ring of an eccentric-type butterfly valve of PTL 4, an annular pocket-shaped recessed part is concentrically formed, and a base part side of this recessed part is interposed between a main body and a retainer. A projection is formed on the retainer, and this projection is engaged in a base part to inhibit pullout of the retainer in an inner diameter direction and leakage of fluid from a back side of the seat ring to a secondary side. Also, to provide a gap between a movable part extending from a base part interposed between the main body and the retainer and the main body, the thickness of the movable part is formed so as to be smaller than the base part. And, the movable part is provided so that, when fluid pressure is applied to the pocket-shaped recessed part, the movable body is deformed in a whirling manner to be deformed so as to dig into a valve body.

CITATION LIST

Patent Literatures

PTL 1: Japanese Patent Application Laid-Open Publication No. 2003-130236
PTL 2: Japanese Patent No. 4327217
PTL 3: Japanese Utility Model Application Publication No. 55-82558
PTL 4: Japanese Patent Application Laid-Open Publication No. 2000-199571

SUMMARY OF INVENTION

Technical Problem

In the butterfly valve of PTL 2, as depicted in the schematic diagram of FIG. 11, the annular groove 2 is formed on one surface side of the annular body 1 in the flat plate shape, and the seal surface part 3 is formed on a secondary side of the groove bottom 4 of this annular groove 2. Thus, a seal surface pressure G regarding sealing of the valve body is applied to the contact point A of the seal surface part 3. When this seal surface pressure G occurs in the direction of the normal to a spherical surface of the valve body indicated by an arrow, if a force on the seat ring 1 by the seal surface pressure G is broken into a component of force Gy, which is a component in a direction passing through the contact point A between the valve body and the seat ring 1 and parallel to its surface (a direction perpendicular to a flowing direction), and a component of force Gx, which is a component parallel to the flowing direction, the component of force Gy is present in the area E of the groove bottom 4, thereby acting in a direction not passing through the annular groove 2. In this manner, with the component of force Gy not approaching the annular groove 2, the seat ring 1 is less prone to warp, and a contact surface pressure with the valve body is increased. With this, in the butterfly valve of PTL 2, while the shape of the seat ring 1 is simplified, the butterfly valve has problems such that durability and operability are not sufficient, the dimensions of the seat ring are changed due to abrasion, compression, or the like to impair durability, and operation torque of the butterfly valve is increased.

As countermeasures against this, it can be thought that a length from the annular groove 2 of the seat ring 1 to the contact point A on a seal side is increased to make the seat ring easily warp. In this case, however, a problem arises in which a seal portion extends in a radial direction, leading to a decrease in diameter of the seat ring 1 and sacrificing flow rate characteristics.

Moreover, in the butterfly valves described in PTLs 1 and 2, a gap is each provided between the seat ring and the valve main body or between the seat ring and the seat retainer, thereby ensuring flexibility of the seat ring. This gap is secured even in a no load state where no fluid pressure is applied and in a full closed state where the valve body makes contact with the seat ring. And, the structure is such that, when the seat ring receives a fluid pressure with the above-mentioned gap side taken as downstream, the seat ring warps to abut on the seat retainer (refer to FIG. 3 of PTL 1 and FIG. 8 of PTL 2).

Therefore, if a state in which the seat ring does not abut on the valve main body or the seat retainer continues for a long period of time, a dimensional change of the seat ring tends to occur due to a creep phenomenon or the like, and the seal surface pressure with the valve body may be decreased.

In PTL 3, the eccentric-type butterfly valve in the structure in which both of the entire flat surfaces of the seat ring are interposed between the retainer and the body as abutting thereon supports only a flowing direction with a stem attachment side as upstream. When a flow with the stem attachment side as downstream is added, it is difficult to ensure sealability.

Moreover, in this seat ring, since the stiffness is set high so as to be able to resist even when the disc is moved by the fluid pressure to be compressed, the seat ring does not have a function of sealing with deformation by fluid, that is, a so-called self seal function.

The seat ring of the eccentric-type butterfly valve of PTL 4 is pressed by the projection of the retainer. However, only with this projection, it is difficult to prevent deformation of the seat ring from a base part side to an inner diameter direction at the time of occurrence of a heat cycle and suppress back leakage, and PTL 4 has a problem similar to that of PTL 2. When deformed by fluid pressure, the movable part is deformed in a gap with the main body. However, in a state in which the base part is pressed by the projection on a primary side, the movable part is swirled by taking a deformation point on the secondary side as a center to be deformed. Therefore, a force in a rotating direction is applied to the base part by taking the deformation point as a center, and fixation of the seat ring as a whole becomes weak. Moreover, since deformation of the base part in a radial direction is not suppressed, the amount of deformation on a seal compressing part side in the inner diameter direction is increased, and seal performance tends to be degraded.

Also, in these eccentric-type butterfly valves, the hardness of the seat ring material itself is increased under low temperature compared with room temperature. In particular, in a seat ring made of PTFE (polytetrafluoroethylene) containing a filler, a necessary fastening surface pressure is also increased. Thus, under room temperature, even if leakage on a gasket side is absent, leakage may occur upon exposure under low temperature.

The present invention was developed to solve the conventional problems, and has an object of providing a butterfly-valve seat ring and fixing structure of the same, and eccentric-type butterfly valve in which, by appropriately ensuring a seal surface pressure between a valve body and a seat ring at the time of sealing while the structure is simplified, durability is improved to maintain excellent operability, the seal surface pressure is ensured for both of positive pressure and counter pressure to exert high sealability, and sealing against back leakage can be reliably made.

Solution to Problem

To achieve the object described above, the invention according to claim 1 is directed to a butterfly-valve seat ring wherein a flexible part with a predetermined material thickness is integrally and extendedly provided on one side surface of an inner diameter of a ring-shaped base body part having a substantially rectangular shape in section and a fixing part is integrally and extendedly provided on one side surface of an outer diameter of the base body part, a recessed-shaped space part is provided between an outer circumferential surface of the flexible part and an inner circumferential surface of the fixing part, and a seal contact part provided to project at an inner diameter position of the flexible part, this seal contact part is positioned on an inner circumferential surface of the flexible part rather than a depth-side position of the space part, and a position of the fixing part on an inner diameter side is set as a supporting point part when the flexible part can warp.

The invention according to claim 2 is directed to the butterfly-valve seat ring wherein an inner circumferential surface of the base body part is a mildly tapered surface from the seal contact part.

The invention according to claim 3 is directed to the butterfly-valve seat ring wherein the space part is formed in a substantially arc shape in section.

The invention according to claim 4 is directed to the butterfly-valve seat ring wherein a fixing base part is configured of the fixing part and an exterior side of the base body part.

The invention according to claim 5 is directed to a fixing structure of a butterfly-valve seat ring for fixing an exterior of a seat ring which is in seal contact with an outer circumferential surface of a disc interposed between a cylindrically-shaped body and an annular seat retainer, wherein the seat ring has an annular shape in which a flexible part protruding at an inner circumferential side part of a base body part and a fixing part protruding at an outer circumferential side part of the base body part are integrally and extendedly provided and the seat ring having a space part between the flexible part and the fixing part, and a gasket part positioned on an annular periphery of the base body part on an outer circumferential side is integrally coupled via a thin thickness part.

The invention according to claim 6 is directed to the fixing structure of the butterfly-valve seat ring, wherein a narrow-width insertion space is provided between an outer circumferential surface of the base body part and an inner circumferential surface of the gasket part, a narrow-width projecting part provided to the seat retainer is inserted in the insertion space, and in state in which a narrow-width side part of the thin thickness part is pressed by a tip of this projecting part at high surface pressure, the thin thickness part is taken as a locally-pressed region.

The invention according to claim 7 is directed to the fixing structure of the butterfly-valve seat ring, wherein a crush margin is provided to a side surface part of the gasket part, the crush margin to be pressed by a pressing part of the seat retainer, and a crush margin is provided to a side surface part of the fixing part, the crush margin to be pressed by a pressing surface part of the seat retainer, and the crush margins are increased in order of the side surface part of the fixing part, the side surface of the gasket part, and the side part of the thin thickness part.

The invention according to claim 8 is directed to the fixing structure of the butterfly-valve seat ring, wherein an inner circumferential surface of the space part is made in contact with an outer surface of a protruding part provided to the seat retainer to protrude.

The invention according to claim 9 is directed to the fixing structure of the butterfly-valve seat ring, wherein a gap part is provided between an outer surface of the fixing part and an inner surface of the seat retainer and a gap is provided between an outer surface of the insertion space and an inner surface of the projecting part of the seat retainer.

The invention according to claim 10 is directed to the fixing structure of the butterfly-valve seat ring, wherein a step part is formed at a position of connecting the outer surface of the fixing part and the insertion space.

The invention according to claim 11 is directed to the fixing structure of the butterfly-valve seat ring, wherein a gap part provided between an outer surface of the gasket part and the inner surface of the seat retainer and a gap part is provided between an inner surface of the insertion space and an outer surface of the projecting part.

The invention according to claim 12 is directed to the fixing structure of the butterfly-valve seat ring, wherein a body step part is provided on a side surface of the body where the thin thickness part abuts.

The invention according to claim 13 is directed to an eccentric-type butterfly valve in which a disc axially and rotatably supported at an eccentric position via a stem in a cylindrical body is provided so as to be able to be hermetically sealed to a seat ring fixed by a seat retainer in the body, wherein the seat ring is configured which that a flexible part with a predetermined material thickness is integrally and extendedly provided on one side surface of an inner diameter of a ring-shaped base body part having a substantially rectangular shape in section and a fixing part is integrally and extendedly provided on one side surface of an outer diameter of the base body part, a recessed-shaped space part is provided between an outer circumferential surface of the flexible part and an inner circumferential surface of the fixing part, and a seal contact part is provided to project at an inner diameter position of the flexible part, this seal contact part being positioned on an inner circumferential surface of the flexible part rather than a depth-side position of the space part, an exterior of the base body part and the fixing part are fixed by the seat retainer, a gap is formed between the base body part and the body, a gap is provided between the flexible part and the seat retainer, and a contact position where an outer surface of an annular projection and an inside inner surface of the space part in contact with each other as a supporting point part when the flexible part can warp.

The invention according to claim 14 is directed to the eccentric-type butterfly valve wherein the annular projection provided to the seat retainer is protruded before a depth part side of the space part to make the outer surface of the annular projection in contact with the inside inner surface of the space part, and a separate part is provided between the inner surface of the annular projection and an outside inner surface of the space part.

The invention according to claim 15 is directed to the eccentric-type butterfly valve wherein a seal surface pressure between the seal contact part and the disc is increased at valve closing in a state in which the flexible part is supported as abutting on the seat retainer.

Advantageous Effects of Invention

From the invention according to claim 1, while the base body part, the flexible part, and the fixing part are integrally formed to simplify the entire shape, the seat ring can be easily attached between the body and the seat retainer. With the seal contact part elastically deformed via the recessed-shaped space part provided between the flexible part and the fixing part, even in either case of fluid pressure at positive pressure and counter pressure, sealing can be made while high sealability is exerted. At that time, with the seal contact part being positioned on the inner circumferential surface of the flexible part as a seat retainer side rather than the depth-side position of the space part, a component of force to be applied in a direction perpendicular to the flow path from the valve body to the seat ring is applied to the seal contact part so as to approach a direction of the space part, and therefore it is possible to deform the flexible part while reducing the entire load to ensure a predetermined seal surface pressure. With this, durability of the flexible part can be improved to suppress abrasion, and an increase of a surface pressure force required for sealing can be prevented to avoid an increase in operation torque. Thus, excellent operability can be maintained, and control by low surface pressure is also possible.

Furthermore, while the amount of elastic deformation is ensured by the space part, stiffness is maintained by the base body part and the fixing part, and the flexible part is caused to warp while suppressing a change in seal inner diameter dimension to keep a predetermined seal surface pressure. With this, an improvement in durability can be achieved.

Still further, the fixing part is supported as being positioned by the supporting point part, and the seal contact part side can be elastically deformed in a positive pressure or counter pressure direction. With this, it becomes difficult for a force to be applied from the seal contact part to the fixing part, thereby suppressing abrasion and compression. In particular, when a force is applied to a counter pressure side, in a state in which the fixing part is pressed by the supporting point part, the flexible part can be elastically deformed to prevent a crush, abrasion, and deterioration of a barrel portion and maintain a seal surface pressure which can reliably seal a high-pressure fluid.

From the invention according to claim 2, with the tapered contact surface provided via the mildly tapered surface, the flexible part can be easily elastically deformed, and the flexible part can be caused to warp with a predetermined amount of deformation in accordance with the fluid pressure without occurrence of a crack or rapture between the flexible part and the fixing part, thereby allowing the seal contact part to exert a predetermined seal surface pressure.

From the invention according to claim 3, when the flexible part is elastically deformed, a force applied to the space part of this flexible part is distributed to avoid stress concentration on the flexible part, thereby causing the entire flexible part to warp at the time of sealing and suppressing load.

From the invention according to claim 4, while the fixing base part side is strongly fixed to prevent a positional shift as a whole, the flexible part side is elastically deformed with respect to the fixing base part to allow sealing. With this, a swing of the seal contact part is suppressed to be made contact with the valve body at a predetermined seal point, thereby exerting uniform seal power.

From the invention according to claim 5, the gasket part is integrally coupled to the annular periphery of the base body part on the outer circumferential surface side. With this, the gasket part is provided as an independent region separately from the base body part. Even when a heat cycle occurs to this gasket part by a fluid and the gasket part is expanded at high temperature, sealability of the gasket part is maintained when the temperature returns to room temperature, and back leakage can be prevented. Furthermore, with the gasket part positioned and fixed via the thin thickness part separately from the fixing part, movement of an excessive portion due to thermal expansion of the gasket part is suppressed by the thin thickness part to suppress deformation on the base body part side. Therefore, stable valve seat sealability can be obtained. Since the fixing part is provided separately from the gasket part, this fixing part is strongly fixed at a predetermined position. The seat ring has the flexible part integrally and extendedly provided to the inner circumferential side part of the base body part and the fixing part integrally and extendedly provided to the outer circumferential side part of the base body part, and has the space part therebetween. With this, the flexible part side is caused to warp via the space part while the fixing part side is fixed, and the seal side with the disc on a tip side of this flexible part is retained at a predetermined position to stably exert high seal surface pressure and maintain excellent sealability for a long period of time.

From the invention according to claim 6, the narrow-width projecting part of the seat retainer is inserted into the insertion space of the seat ring, and the narrow-width side part of the thin thickness part is pressed by the tip of the projecting part with high surface pressure to take the thin thickness part as a locally-pressed region. With this, by taking the strongly interposed and pressurized thin thickness part as a boundary, the gasket part and the fixing part are functionally divided, and the gasket part outside the fixing part, which is a fixing side of the seat ring, is fixed, and this gasket part exerts an independent seal function. With this, back leakage can be prevented by the gasket part while preventing deformation to the base body part side.

From the invention according to claim 7, in a state in which the side part of the thin thickness part with a large crush margin is positioned and fixed by being strongly pressed by the seat retainer, while a deformation portion of this thin thickness part is escaped, the gasket part with the second largest crush margin is pressed for close contact and fitting, thereby allowing fixing while enhancing sealability. Next, while the deformed part of the thin thickness part is escaped to a fixing part side with the smallest crush margin, this fixing part is fixed by fitting. With this, without moving the deformed excessive region to a flexible part side, positioning can made on the fixing part and gasket part side, and the entire seat ring can be fixed. After the seat ring is attached, this fit-in structure prevents movement of the deformed region of the fixing part to the gasket part side to ensure a seal state by the gasket part, thereby allowing a back leakage preventing function to be maintained.

From the invention according to claim 8, with the inner circumferential surface of the space part in contact with the outer surface of the protruding part, the movement of the fixing part is regulated by the protruding part to prevent a positional shift of the entire seat ring. In this state, while the flexible part is caused to warp, the seat ring can be attached to be provided so as to be able to support either case of application of a fluid pressure at positive pressure or counter pressure.

From the invention according to claim 9, the deformed excessive region of the fixing part is accommodated in the gap part by pressurization by the seat retainer, and the fixing part can be fixed at a predetermined position by close contact and fitting. Positioning and fixing are performed with high accuracy to keep accuracy on the flexible part side. The seal part of this flexible part and the valve body are arranged in a predetermined positional relation to allow valve closing and sealing while exerting high sealability. Also, the excessive region of the fixing part deformed by thermal expansion is absorbed by the gap to prevent deformation to the base body part side, and stable sealability can be maintained with respect to also a temperature change.

From the invention according to claim 10, deformation of the excessive region of the fixing part with pressing by the seat retainer is regulated by the step part. Via this step part, the fixing part can be in close contact with and fixed to the seat retainer in a positioned state. With this, a positional shift of the fixing part can be prevented, and movement of the excessive region due to thermal expansion can also be regulated. Thus, deformation of each of the fixing part and the gasket part after attachment is prevented, and sealability of the seat ring is ensured while the back leakage preventing function by the gasket part and the function of fixing the entire seat ring by the fixing part are maintained.

From the invention according to claim 11, the excessive region deformed by pressing by the seat retainer is absorbed by the gap to maintain sealability, prevent deformation by thermal expansion, and maintain stable sealability even with respect to a temperature change.

From the invention according to claim 12, with the thin thickness part engaged by the body step part, by using a compression ratio of this thin thickness part, movement of the gasket part is prevented, and back leakage of the fluid between the body and the seat ring can be reliably prevented.

From the invention according to claim 13, the seat ring with its entire shape simplified is easily attached, and sealing is made by the seal contact part of this seat ring. With this, even when a high-pressure fluid flows or in either case of positive pressure and counter pressure, high sealability can be exerted in a valve closed state. And, by the gap provided between the base body part and the body side, a flexible area of the seat ring at positive pressure is increased, and high sealability using the self seal function can be ensured.

Also, by the gap provided between the flexible part and the seat retainer, a pressing force from the valve body and the seat retainer is not applied to the flexible part and the base body part in a valve open state. Therefore, stable sealability can be maintained for a long period of time. Furthermore, with the contact position between the outer surface of the annular projection and an the inside inner surface of the space part being taken as a supporting point part of the flexible part, the fixing part is supported as being positioned by this supporting point part, and the seal contact part side of the seat ring can be elastically deformed in a positive pressure or counter pressure direction.

With this, when a force is applied to a counter pressure side, the flexible part is elastically deformed in a state in which the fixing part is pressed by the supporting point part. With this, the position of the seal contact part is stabilized for a long period of time, and a seal surface pressure required for sealing a high-pressure fluid can be obtained while an abnormal crush, abrasion, and deterioration of a barrel portion are prevented.

From the invention according to claim 14, with the space part provided in the state in which the annular projection is in contact with the inside inner surface of the space part, the fixing part is regulated by the annular projection to prevent a positional shift of the entirety. In this state, in a state in which the flexible part is caused to warp in advance as being elastically deformed, the seat retainer is attached to the separate part. With this, even if a fluid pressure of either positive pressure or counter pressure is applied, the flexible part is deformed to seal the high-pressure fluid while exerting high sealability.

From the invention according to claim 15, in a valve closed state, since a counter force occurs to the flexible part in accordance with abutment of the seat retainer, this counter force may be added to the seal surface pressure to increase the seal surface pressure, and stable sealability can be exerted from low pressure.

DESCRIPTION OF EMBODIMENTS

Figure 1:
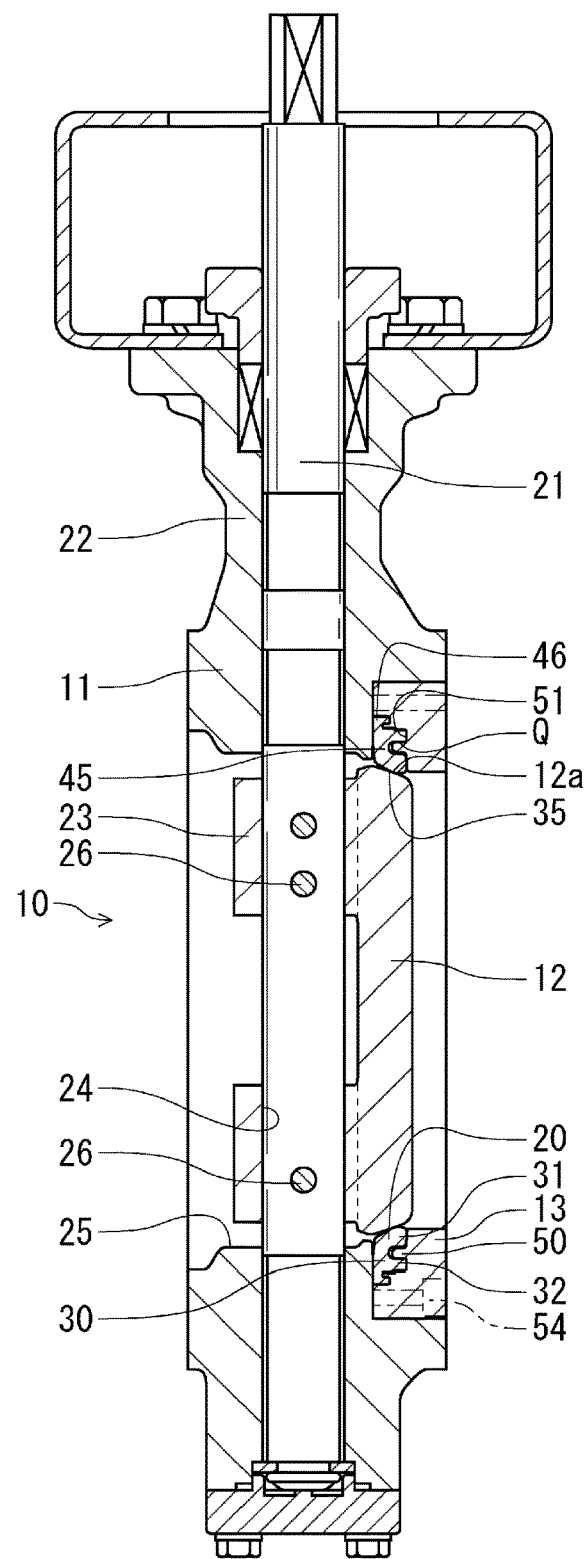
FIG. 1 is a longitudinal sectional view depicting an embodiment of an eccentric-type butterfly valve.
Figure 2:
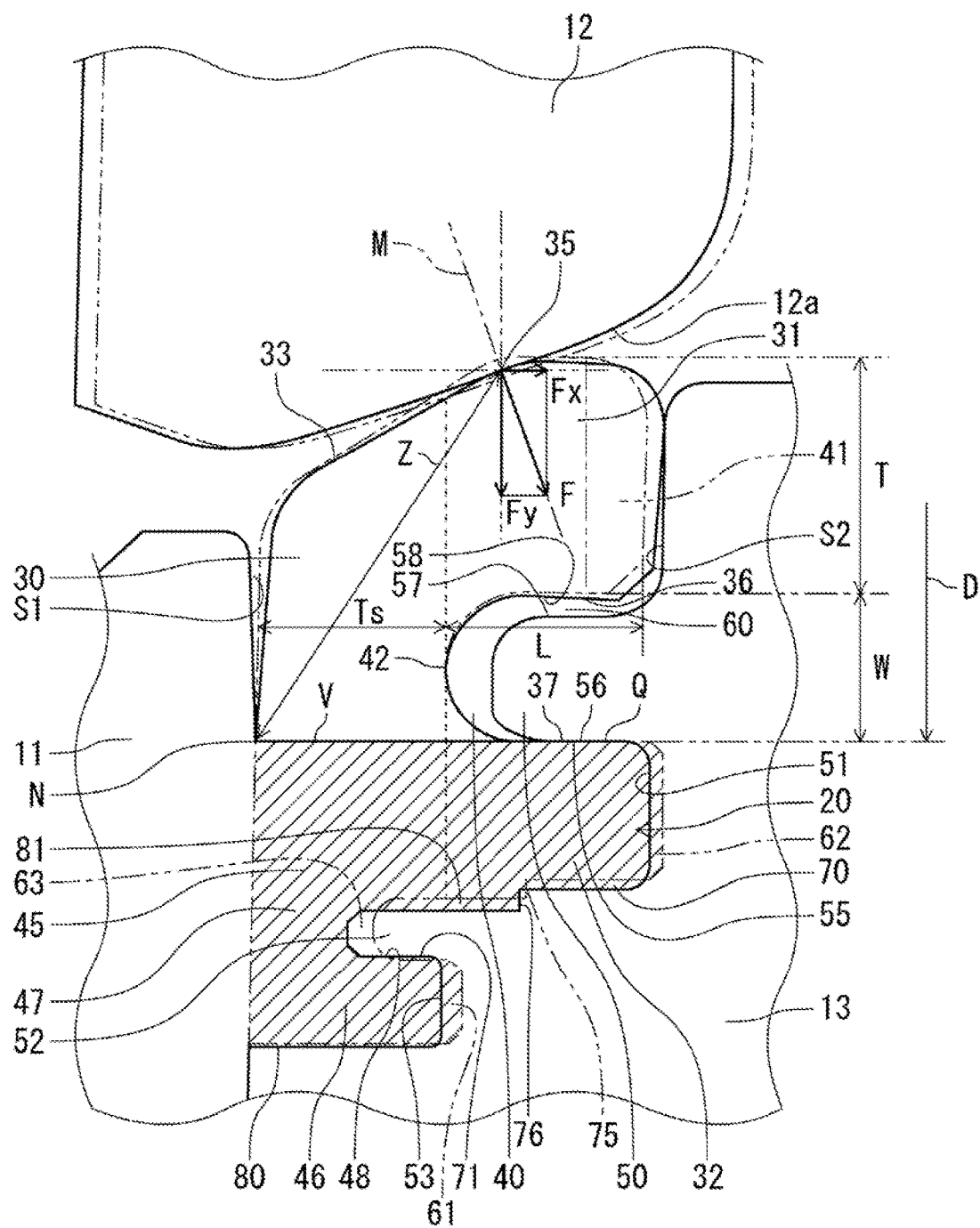
FIG. 2 is an enlarged schematic diagram of main parts of FIG. 1.

In the following, embodiments and operations of the butterfly-valve seat ring and eccentric-type butterfly valve in the present invention are described based on the drawings. In FIG. 1, a longitudinal sectional view is depicted, depicting one embodiment of an eccentric-type butterfly valve having a butterfly-valve seat ring of the present invention attached thereto. In FIG. 2, a portion near a lower part of a valve body (disc) of the eccentric-type butterfly valve of FIG. 1 is depicted. A working pressure of the butterfly valve in the present invention is assumed to be 2 MPa to 5 MPa. It is assumed in the present embodiment that room temperature is approximately 20 degrees Celsius, high temperature is approximately 200 degrees Celsius, and low temperature is approximately −30 degrees Celsius.

The eccentric-type butterfly valve of FIG. 1 (hereinafter referred to as a valve main body 10) has a body 11, a disc 12, a seat retainer 13, and a seat ring (hereinafter referred to as a seat ring main body 20). Among these, the body 11, the disc 12, and the seat retainer 13 are molded of a metal material such as stainless steel and ductile cast iron.

The body 11 is formed in a cylindrical shape, and an upper and lower part of this body 11 is provided with a shaft insertion part 22 for attaching a stem 21. The disc 12 is formed in a substantially disc plate shape, and a valve body seal surface 12a is provided on an outer circumferential side of this disc 12. Also, on one surface side, a boss part 23 is formed so as to protrude. In this boss part 23, a hole part 24 for mounting the stem 21 is formed so as to be eccentric from a seal position. The disc 12 is integrally fixed to the stem 21 with a taper pin 26 at an eccentric position in the body 11, in a state in which the stem 21 is inserted in the hole part 24. With this, the disc 12 is rotatably and pivotally supported, in an eccentric state, to a flow path 25 via the stem 21, and this disc 12 is provided so as to be able to hermetically seal the seat ring main body 20 fixed to the seat retainer 13 in the body 11. Note in FIG. 2 that the right side of the seat ring main body 20 is an upstream side of the flow path 25 and the left side thereof is a downstream side of the flow path 25. The upstream side may be a primary side when in the case of positive pressure where a fluid flows from the upstream side to the downstream side.

In FIG. 2, the seat ring main body 20 is annually molded of a resin material such as, for example, PTFE (polytetrafluoroethylene). In the present embodiment, PTFE with a filler such as 15% carbon is adopted, and the seat ring main body 20 has a ring-shaped base body part 30, flexible part 31, and fixing part 32. In the drawing, a broken line indicates a boundary of the base body part 30, the flexible part 31, and the fixing part 32 in shape. The broken line does not indicate a boundary of the functions of the respective base body part 30, flexible part 31, fixing part 32, and a gasket part 46. For example, when the flexible part 31 warps, not only this flexible part 31 but also a part of the base body part 30 can warp as a flexible region.

A two-dot-chain line of the seat ring main body 20 depicts the shape of the seat ring main body 20 when the seat ring main body 20 is attached between the body 11 and the seat retainer 13 and at the time of valve opening. A solid line of the seat ring main body 20, in particular, a solid line near the flexible part 31, depicts the shape when, with the disc 12 abutting on the seat ring main body 20, a side surface of the flexible part 31 abuts on the seat retainer 13 as an abutting part 34.

The base body part 30 is provided in a substantially rectangular shape in section, serving a function of a base part of the seat ring main body 20. On one side surface of the inner diameter of the base body part 30, the elastically-deformable flexible part 31 with a predetermined material thickness integrally extends. On one side surface of the outer diameter of the base body part 30, the fixing part 32 fixed between the body 11 and the seat retainer 13 integrally extends. An inner circumferential surface 33 of the base body part 30 is provided as a mildly tapered surface continuous from a seal contact part 35, which will be described further below, of the flexible part 31. This tapered surface 33 may be in a straight line shape or a curved line shape, or may be provided with a recess and, by being provided in a shape as appropriate, flexibility of the flexible part 31 at the time of abutment of the disc 12 can also be enhanced.

The flexible part 31 is a region for sealing with the disc 12. Between an outer circumferential surface 36 of this flexible part 31 and an inner circumferential surface 37 of the fixing part 32, a recessed space part 40 is provided. With this space part 40, the flexible part 31 uses a surface pressure or fluid pressure from the disc 12, thereby becoming able to warp in any direction of positive pressure (fluid pressure from an upstream side to a downstream side) and counter pressure (fluid pressure from the downstream side to the upstream side).

At an inner diameter position of the flexible part 31, the seal contact part 35 to be sealed with the disc 12 is formed so as to protrude. This seal contact part 35 is annularly provided in a C surface shape in section or an R surface shape in section and with a seal width so as to be positioned on the inner circumferential surface of the flexible part 31 on a seat retainer 13 side rather than a depth-side position of the space part 40 and, by this seal width, can be sealed while making a surface contact with the disc 12.

Figure 3:
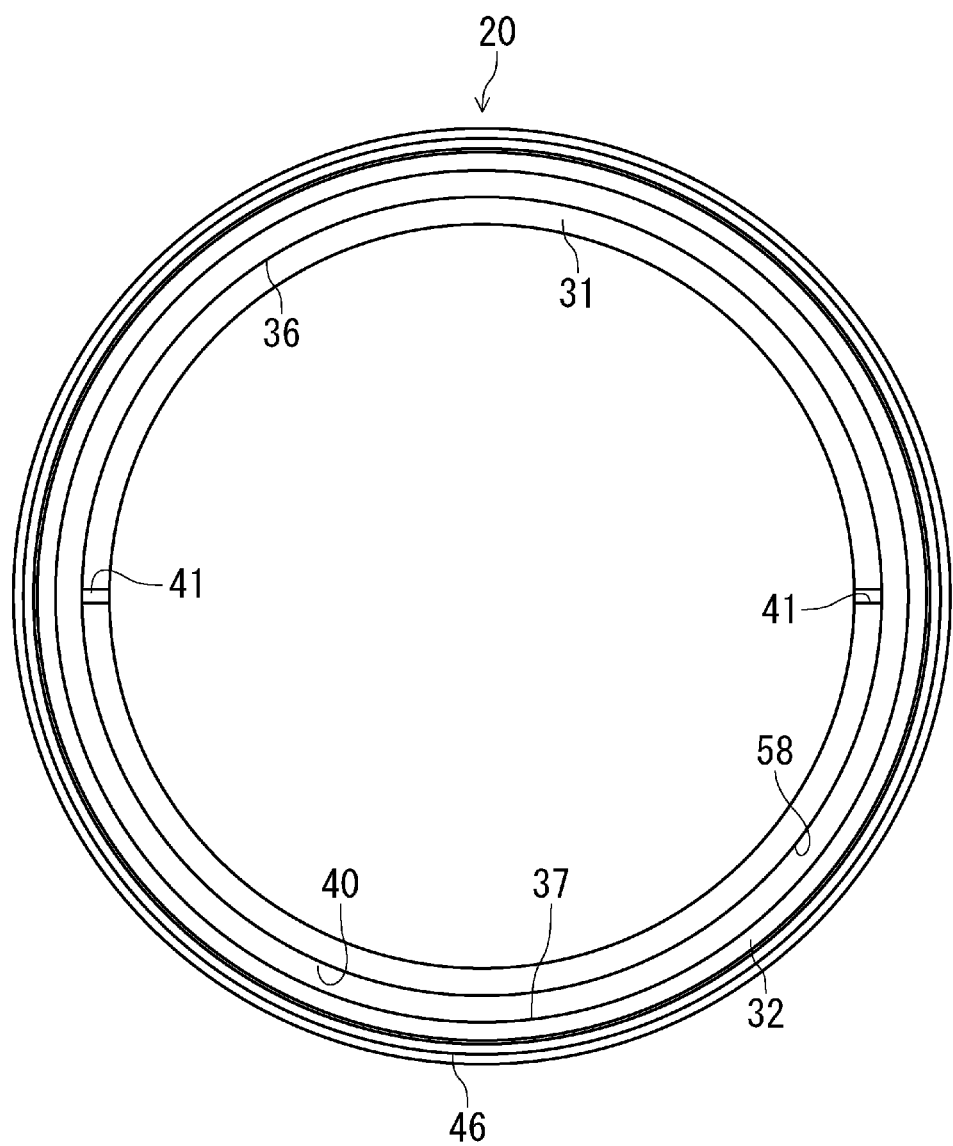
FIG. 3 is a front view depicting a seat ring.

In FIG. 2 and FIG. 3, on the seat retainer 13 side of the flexible part 31, groove parts 41 communicating the side surface of the flexible part 31 to a radial direction are provided at a plurality of locations in a radial direction.

The space part 40 is formed in a substantially arc shape in section, and is formed in a groove shape concentrically with the seat ring main body 20 with a width W and a depth L. These width W and depth L, and a thickness T of the flexible part 31 from the seal contact part 35 to the space part 40 in a radial direction and a thickness Ts of the base body part 30 can be respectively set at appropriate dimensions. With this, flexibility of the flexible part 31 by pressing from the disc 12 is improved to prevent excessive deformation, allowing durability to be improved. In this case, the flexible part 31 is desirably formed so that the thickness T and the depth L are large and, if so, the thickness of the flexible part 31 is increased to suppress the spread of the inner diameter of a portion near a contact part with the disc 12, improving durability at the time of sealing.

The fixing part 32 is provided over the entire outer diameter side of the seat ring main body 20 rather than the space part 40 so as to attach the seat ring main body 20 between the body 11 and the seat retainer 13 and, after attachment of the fixing part 32, is supported by the seat retainer 13 while a position on its inner diameter side is positioned by a supporting point part Q. Via this supporting point part Q, the flexible part 31 can warp. The fixing part 32 has any shape as long as it has a structure on an outer diameter side of the space part 40, the structure allowing only this fixing part 32 side to be retained and fixed by the body 11 and the seat retainer 13. The supporting point part Q is a face region provided to serve a function of positioning and supporting the fixing part 32, and the flexible part 31 does not warp by using this supporting point part Q as the center of leverage.

The fixing part 32 and an exterior side of the base body part 30 configure a fixing base part 45 depicted as hatched. This fixing base part 45 is interposed between the body 11 and the seat retainer 13 via the fixing part 32. The flexible part 31 is deformable so as to warp to this fixing base part 45. In this manner, a positional shift of the entire seat ring main body 20 of the flexible part 31 due to fluid pressure is prevented.

The gasket part 46 is formed to be integrally coupled via a thin thickness part 47 so as to be positioned on an annular periphery on an outer circumferential surface side of the base body part 30 on an outer circumferential side of the fixing part 32. This gasket part 46 prevents leakage between the body 11 and the seat retainer 13. In addition to the fixing part 32, the seat ring main body 20 has a fixing structure attached between the body 11 and the seat retainer 13 via the gasket part 46. The thin thickness part 47 is provided so as to have a thin thickness, for example, on the order of 0.8 mm to 1.5 mm, when the nominal diameter of the valve is 100 A, although depending on the material of the seat ring main body 20, so as to be able to suppress an outflow of an excessive region due to thermal expansion.

In the seat ring main body 20, between the outer circumferential surface of the base body part 30 and the inner circumferential surface of the gasket part 46, a narrow-width insertion space 48 is provided. Also, a side surface part of the gasket 46 part, a side surface of the fixing part 32, and a side part of the thin thickness part 47 are provided with crush margins 61, 62, and 63, respectively, which are pressed, when the seat retainer 13 is attached, by the seat retainer 13 to be deformed.

As depicted in FIG. 2, on an outer diameter side of the seat ring main body 20, the fixing part 32 and the outer side of the base body part 30 and the gasket part 46 configure the fixing base part 45 depicted as hatched. This fixing base part 45 is interposed between the body 11 and the seat retainer 13 via the fixing part 32 to be fixed. The flexible part 31 is deformable so as to warp with respect to this fixing base part 45.

The seat retainer 13 is provided in a substantially annular shape, with an inner diameter side on a body 11 side being formed as being notched in FIG. 1. To this notched region, the fixing part 32 of the seat ring main body 20 is attachably provided. At a position opposing the space part 40 of the seat ring main body 20 as a recessed region, a protruding part 50 having a length shorter than the depth of this space part 40 is provided.

On an outer diameter side of the protruding part 50, a recessed-shaped groove 51 is formed. This recessed-shaped groove 51 of the seat ring main body 20 is formed so as to be shorter than the length of the fixing part 32 of the seat ring main body 20 from an end face side in a flow path direction and to have a width longer than the fixing part 32 in a radial direction.

With this, a gap part 70 is provided between the outer surface of the fixing part 32 of the seat ring main body 20 and the inner surface of the seat retainer 13. The capacity of this gap part 70 is set smaller than the volume of overhanging of the fixing part 32 of the seat ring main body 20 to an outer diameter direction because of being pressed by the recessed-shaped groove 51 of the seat retainer 13 by the volume of the crush margin 62. And, this overhanging of the fixing part 32 is set by steps 75 and 76, which will be described further below, so as not to spread to a body 11 side.

With the above-described structure, the fixing part 32 of the seat ring main body 20 pressed by the seat retainer 13 fills to be fixed in the recessed-shaped groove 51 of the seat retainer 13.

On the outer diameter side of the recessed-shaped groove 51, a narrow-width projecting part 52 is formed. This projecting part 52 is formed so as to be longer than the length of the side part of the thin thickness part 47 from an end face side in the flow path direction and to have a width longer than the thin thickness part 47 in the radial direction. The projecting part 52 is inserted into the narrow-width insertion space 48, and is provided so that a tip of this projecting part 52 presses the narrow-width side part of the thin thickness part 47 with high surface pressure to make the thin thickness part 47 as a locally-pressed region.

On the outer diameter side of the projecting part 52, an attachment recessed groove 53 is formed. This attachment recessed groove 53 is formed so as to be longer than the length of the gasket part 46 on a tip side from an end face side in the flow path direction and to have a width longer than a tip part in the radial direction.

With this, a gap part 80 is provided between the outer surface of the gasket part 46 of the seat ring main body 20 and the inner surface of the seat retainer 13. Also, a gap part 71 is provided between the inner surface of the gasket part 46 and the outer surface of the projecting part 52 of the seat retainer 13. The capacities of these gap parts 80 and 71 are set smaller than the volume of overhanging of the thin thickness part 47 of the seat ring main body 20 to the outer diameter direction because of being pressed by the projecting part 52 of the seat retainer 13 by the volume of the crush margin 63 and the volume of overhanging of the gasket part 46 of the seat ring main body 20 to the inner and outer diameter direction because of being pressed by the attachment recessed groove 53 of the seat retainer 13 by the volume of the crush margin 61.

With the above-described structure, the gasket part 46 of the seat ring main body 20 pressed by the seat retainer 13 fills in the attachment recessed groove 53 of the seat retainer 13. And, a ratio of this filling is set at a fill-in ratio to the extent to which sealability between the body 11 and the seat retainer 13 is not decreased by heat shrinkage of the seat ring main body 20 even with a heat cycle of low-temperature exposure such as room temperature→low temperature-→room temperature.

Like these, the crush margin 61 to be pressed by the attachment recessed groove 53 as a pressing part of the seat retainer 13 is provided on a side surface part of the gasket part 46, and the crush margin 62 to be pressed by the recessed-shaped groove 51 as a pressing surface part of the seat retainer 13 is provided on a side surface part of the fixing part 32. Also, these crush margins are set to be increased in the order of the side surface part of the fixing part 32, the side surface part of the gasket part 46, and then the crush margin 63 provided on a side part of the thin thickness part 47.

In the above-described seat ring main body 20, the inner circumferential surface of the fixing part 32 is attached in a state of being in contact with the outer surface of the above-described protruding part 50 provided to the seat retainer 13 to protrude. With this, the seat ring main body 20 is fixed, while the fixing base part 45 is regulated by the seat retainer 13 to the radial direction to prevent its positional shift.

A step part 75 is formed at a position of connecting the outer surface of the fixing part 32 and the insertion space 48. The seat ring main body 20 is deformed to become fixable so that this step part 75 engages with a step part 76 formed on the seat retainer 13 in a close contact state.

A gap 81 is provided between the inner surface of the insertion space 48 and the outer surface of the projecting part 52. With the gap 81, an excessive region due to thermal expansion of the fixing part 32 and the fixing base part 45 of the seat ring main body 20 is absorbed to prevent influences on the seal part 35. In FIG. 2, a state is depicted in which the excessive region due to thermal expansion is absorbed by the gap 81.

In FIG. 1, when the seat ring main body 20 is attached to the valve main body 10, in a state in which this seat ring main body 20 is interposed between the body 11 and the seat retainer 13, the seat retainer 13 is fastened to the body 11 with a fastening bolt 54, and the exterior of the base body part 30 and the fixing part 32 are fixed by the seat retainer 13.

This fastening of the seat retainer 13 to the body 11 with the fastening bolt 54 is not so-called complete fastening, in which the seat retainer 13 is fastened to the body 11 in a state of being pressed onto the seat ring main body 20 until each of the above-described crush margins 61, 62, and 63 disappears, but temporary fastening to the extent to which, for example, the crush margin 62 of the fixing part 32 is retained without being crushed.

Then, with the butterfly valve according to the present invention being interposed in a piping flange (not depicted) and with a piping bolt being secured, the seat retainer 13 is completely fastened to the body 11 until each of the crush margins 61, 62, and 63 disappears. With this temporary fastening, an initial elastic force of the seat ring main body 20 can be retained until a time immediately before piping. After piping, each seal function can be exerted for a long period of time.

Regarding each of the crush margins 61, 62, and 63, the crush margin 63 on the side part of the thin thickness part 47 of the gasket part 46 is set as the largest. When the narrow-width projecting part 52 is inserted into the narrow-width insertion space 48, in a state in which the side part of the thin thickness part 47 is pressed by the tip of the projecting part 52 with high surface pressure, this thin thickness part 47 becomes a locally-pressed region, and deformation occurs with this thin thickness part 47 as a center, and the state becomes such that a fixing part 32 side and a gasket part 46 side are separated from each other. Also, the crush margin 61 on the tip side of the gasket part 46 is set as large next to the crush margin 63 on the side part of the thin thickness part 47. This gasket part 46 is deformed, and the gasket part 46 as a whole makes close contact with and fits in the attachment recessed groove 53. With the thin thickness part 47 crushed earlier, a deformed portion of the gasket part 46 is prevented from flowing out to a fixing part 32 side.

In this manner, by using the crush margins 61, 62, and 63, the gasket part 46 as a base end side of the seat ring main body 20 is attached with a so-called fit-in structure without an escape, which is said to be effective from high temperature to room temperature ranges particularly in a hard resin-made seat such as PTFE, thereby achieving positioning and fixing while the seat ring main body 20 is largely crushed to prevent an occurrence of an attachment error. Furthermore, with close contact and fitting of the gasket part 46 provided independently of the fixing part 32, an excellent back leakage preventing function is exerted.

Subsequently, a fixing part 32 side of the crush margin 62 smaller than the crush margin 61 is pressed by the recessed-shaped groove 51 to make close contact and fit in. Here, since the crush margin 63 on the side part of the thin thickness part 47 is larger, the excessive region on the fixing part 32 side is not deformed to a gasket part 46 side. Also, with the step part 75 formed at the position of connecting the outer surface of the fixing part 32 and the insertion space 48 engaging with the step part 76, deformation of this excessive region is regulated. Also, even if movement of the fixing part 32 due to thermal expansion occurs, such movement is absorbed by the gap 81. Note that since the crush margin 62 of the fixing part 32 is suppressed to be small, the occurrence of the excessive region due to a heat cycle is reduced.

To form the gasket part 46 in the fit-in structure without an escape as described above, in fitting at the time of assembly of the seat ring main body 20 with the seat retainer 13 and the body 11, the thin thickness part 47 is started to be crushed first, thereby suppressing an outflow of the excessive portion.

Also, at an initial stage at the time of assembly, the compression ratio of the thin thickness part 47 is set higher than that of the gasket part 46, thereby suppressing an outflow of the gasket part 46 from the thin thickness part 47. Also, by pressing the narrow-width thin thickness part 47 with high surface pressure by the tip of the projecting part 52, not only the seal function of the gasket part 46 but also that of the thin thickness part 47 is provided to increase sealability as a whole. In the present embodiment, regarding each region of the seat ring main body 20, the thin thickness part 47 was pressed and deformed at a ratio of approximately 20%, the gasket part 46 at a ratio of approximately 10%, and the fixing part 32 at a ratio of approximately 3%, with respect to the thickness before each region is interposed between the body 11 and the seat retainer 13.

In this manner, a seat retainer 13 side of the fixing base part 45 is fixed so as to make close contact with and fill in the recessed-shaped groove 51 and the attachment recessed groove 53 in the fit-in structure without an escape, and a body 11 side is in a close-contact seal state. This allows mounting while preventing a positional shift of the entire fixing base part 45. Thus, fixing is more strongly made by the fixing base part 45 as a mounting side of the seat ring main body 20, back leakage of this fixing base part 45 due to a heat cycle is prevented, and deformation to a flexible part 31 side as a seal side is prevented. With this, the flexible part 31 warps without receiving influences by heat expansion, and the seal part 35 can be arranged at a predetermined position with high accuracy, thereby allowing valve closing and sealing while achieving high seal surface pressure.

When the seat ring main body 20 is attached, if the thin thickness part 47, the gasket part 46, and then the fixing part 32 are pressed and crushed in this order, the crush margins 61, 62, and 63 may be set at dimensions other than those described above.

After attachment of the seat retainer main body 20, as depicted in FIG. 2, a clearance S1 is provided between the base body part 30 and the body 11, and a clearance S2 is provided between the flexible part 31 and the seat retainer 13. The clearance S2 is provided between an end surface along a centripetal direction of the flexible part 31 and a side surface along a centripetal direction of the seat retainer 13. The centripetal direction being the vertical direction illustrated in the drawing figures. With these clearance S1 and clearance S2, the flexible part 31 is deformable to a primary side and a secondary side of the flow path 25.

Here, the protruding part 50 protrudes before a depth part 42 side as a depth-side position of the space part 40, an outer surface 55 of this protruding part 50 is in contact with an inner circumferential surface 56 of the space part 40, and a separate part 60 is provided between an inner surface 57 of the protruding part 50 and an outside inner surface 58 of the space part 40.

A position at this time where the outer surface 55 of the protruding part 50 and the inner circumferential surface 56 of the space part 40 are made contact with each other is the supporting point part Q which supports the fixing part when the above-described flexible part 31 can warp.

In this manner, in a state in which the inner circumferential surface 56 of the space part 40 is made contact with the outer surface 55 of the protruding part 50, the fixing base part 45 is attached so as to fit between the body 11 and the seat retainer 13, thereby fixing the seat ring main body 20 while preventing pullout. Thus, even when the surface pressure force in a direction of attachment to the fixing part 32 is decreased, an influence by applying pressure by the fluid or by pressing of the disc 12 is hardly received, and a positional shift of the fixing part 32 is prevented, thereby contributing also to durability of the seat ring main body 20 as a whole.

Furthermore, even if the surface pressure force when a portion near the gasket part 46 is interposed is decreased by creep or the like, with the fixing part 32 fitting in the recessed-shaped groove 51, a decrease in retaining force due to creep is supplemented. As a result, a strong fixing state of the fixing part 32 is retained even when the seat ring main body 20 moves or falls down by an excessive fluid pressure or pressing from a disc 12 side.

When a heat cycle occurs and the state becomes at high temperature, due to a difference between coefficients of linear expansion of metal and resin, the fixing base part 45 of the seat ring main body 20 tends to become not accommodated in a groove region. This excessive region is deformed so as to extend off between the outer surface of the gasket part 46 and the inner surface of the seat retainer 13 by the fit-in structure without an escape. Here, by the thin thickness part 47 coupling the base body part 30 and the gasket part 46, an outflow of the excessive region from the groove region is suppressed, and stable sealability can be maintained even when the temperature returns to the room temperature.

Also, the excessive region of the seat ring main body 20 at the time of high temperatures is deformed so as to escape into the gap 81 provided between the inner surface of the insertion space 48 and the outer surface of the projecting part 52. With this, the movement of the excessive region to the inner diameter side of the seat ring main body 20 is suppressed. Thus, the inner diameter of the seat ring main body 20 at the time of high temperatures is prevented from being decreased, and an increase of the pressing margin with the disc 12 is suppressed, thereby allowing sealability to be maintained.

On the other hand, even if the seat ring main body 20 is exposed to low temperature, back leakage from a gasket part 46 side can be prevented, a dimensional change on an inner diameter side of the seat ring is suppressed, and sealability can be ensured.

On an end part side of the outer diameter of the fixing part 32 of the seat ring main body 20 in the present embodiment, the hook-shaped gasket part 46 is integrally provided to extend with an appropriate size. With this gasket part 46, leakage between the body 11 and the seat retainer 13 is prevented.

Note that the above-described broken line does not restrict the function of each part of the base body part 30, the flexible part 31, and the fixing part 32. That is, when the flexible part 31 warps, not only this flexible part 31 but also a part of the base body part 30 has a function as a flexible region. Also, the seat ring main body 20 is fixed by not only the fixing part 32 (fixing base part 45), and the gasket part 46 also has a function for fixing the seat ring main body 20.

On the other hand, the seat retainer 13 is provided in a substantially annular shape, and the inner diameter side on the body 11 side is formed as being notched. To this notched region, the fixing part 32 of the seat ring main body 20 is attached. At the position opposing the space part 40 of the seat ring main body 20 as this recessed region, the annular projection 50 having a length shorter than the depth of this space part 40 is provided.

On the outer diameter side of the annular projection 50, the recessed-shaped groove 51 is formed. This recessed-shaped groove 51 of the seat retainer 13 is formed so as to be shorter than the length of the fixing part 32 of the seat ring main body 20 from the end face side in the flow path direction and to have a width wider than the fixing part 32 in the radial direction.

On the outer diameter side of the recessed-shaped groove 51, the convex part 52 is formed. This convex part 52 is formed so as to be longer than the length of the side part of the thin thickness region as a region where the gasket part 46 connects to the fixing base part 45 from the end face side in the flow path direction and to have a width narrower than the thin thickness region in the radial direction. With this, the convex part 52 can press the thin thickness region to the flow path direction.

On the outer diameter side of the convex part 52, the attachment recessed groove 53 is formed. This attachment recessed groove 53 is formed so as to be longer than the length of the gasket part 46 on the tip side from the end face side in the flow path direction and to have a width wider than the tip part in the radial direction.

When the above-described seat ring main body 20 is attached, in a state in which this seat ring main body 20 is interposed between the body 11 and the seat retainer 13, the seat retainer 13 is fastened to the body 11 with the fastening bolt 54, and the exterior of the base body part 30 and the fixing part 32 are fixed by the seat retainer 13.

On that occasion, the crush margin on the side part of the thin thickness region of the gasket part 46 is set the largest. When the convex part 52 is inserted, with the side part of the thin thickness region being at high surface pressure by the tip of the convex part 52, this thin thickness region becomes a locally-pressed region, and deformation occurs with this thin thickness part as a center, and the state becomes such that the fixing part 32 side and the gasket part 46 side are separated from each other. Also, the crush margin not depicted on the tip side of the gasket part 46 is set as large next to the crush margin on the side part of the thin thickness part region. This gasket part 46 is deformed, and the gasket part 46 as a whole makes close contact with and fits in the attachment recessed groove 53. With the thin thickness region crushed earlier, the deformed portion of the gasket part 46 is prevented from flowing out to the fixing part 32 side.

In this manner, by using the crush margins, the gasket part 46 as a base end side of the seat ring main body 20 is attached with the so-called fit-in structure without an escape, which is said to be effective from high temperature to room temperature ranges particularly in a hard resin-made seat such as PTFE, thereby achieving positioning and fixing while the seat ring main body 20 is largely crushed to prevent an occurrence of an attachment error. Furthermore, with close contact and fitting of the gasket part 46 provided independently of the fixing part 32, an excellent back leakage preventing function is exerted.

Subsequently, the fixing part 32 side of the smaller crush margin is pressed by the recessed-shaped groove 51 to make close contact and fit in. Here, since the crush margin on the side part of the thin thickness region is larger, the excessive region on the fixing part 32 side is not deformed to the gasket part 46 side. Note that the crush region of the fixing part 32 is suppressed to be small and an escape of the excessive region is provided, thereby reducing the occurrence of the excessive region due to a heat cycle.

In this manner, at the time of attachment of the seat ring main body 20, while the gasket part 46 is fixed with the so-called fit-in structure without an escape, the entire fixing base part 45 side is attached so as to fit in between the body 11 and the seat retainer 13. In a state in which the seal contact part 35 is arranged with high accuracy at a predetermined position by positioning this fixing base part 45, the flexible part 31 side can warp to the fixing base part 45, thereby allowing high sealability to be exerted.

After attachment of the seat ring main body 20, as depicted in FIG. 2, in a valve open state, the gap S1 is provided between the base body part 30 and the body 11, and the gap S2 is provided between the flexible part 31 indicated by the two-dot-chain line and the seat retainer 13 by solid lines. With these gaps S1 and S2, the flexible part 31 after attachment of the seat ring main body 20 is deformable to a body 11 side or a seat retainer 13 side.

The annular projection 50 protrudes before the depth part 42 side as a depth-side position of the space part 40, the outer surface 55 of this annular projection 50 is in contact with the inside inner surface 56 of the space part 40, and the separate part 60 is provided between the inner surface 57 of the annular projection 50 and the outside inner surface 58 of the space part 40.

The position at this time where the outer surface 55 of the annular projection 50 and the inside inner surface 56 of the space part 40 are made contact with each other is the supporting point part Q which supports the fixing part when the above-described flexible part 31 can warp. Therefore, since the end face on the seat ring side of the annular projection 50 is separated from the depth part 42 of the space part 40 of the seat ring main body 20, the annular projection 50 does not become an obstacle when the flexible part 31 is tilted.

With the fixing part 32 of the seat ring main body 20 fitting in the recessed-shaped groove 51 as being compressed and deformed, the convex part 52 fitting in between the fixing part 32 and the gasket part 46, and the gasket part 46 fitting in the attachment recessed groove 53 as being compressed and deformed, the flexible part 31 side becomes deformable in a state in which the seat ring main body 20 is positioned and fixed between the seat retainer 13 and the body 11.

In this manner, in a state in which the outer surface 55 of the annular projection 50 is made contact with the inside inner surface 56 of the space part 40, the fixing base part 45 is attached so as to fit in a hermetically-sealed space region configured of an outer diameter side of the annular projection 50 of the seat retainer 13 and the body 11, thereby causing the seat ring main body 20 to be strongly fixed. Thus, even when the surface pressure force in the direction of attachment to the fixing part 32 is decreased, an influence by applying pressure by the fluid or by pressing by the disc 12 is hardly received, and a positional shift of the fixing part 32 is prevented, thereby contributing also to durability of the seat ring main body 20 as a whole.

Furthermore, even if the surface pressure force when the portion near the gasket part 46 is interposed is decreased by creep or the like, with the fixing part 32 fitting in the recessed-shaped groove 51, a decrease in retaining force due to creep is supplemented. As a result, a strong fixing state of the fixing part 32 is retained even when the seat ring main body 20 moves or falls down by an excessive fluid pressure or pressing from the disc 12 side.

Since the gasket part 46 is fixed to the seat retainer 13 with the fit-in structure without an escape, a seal function independent of the fixing part 32 is exerted. Furthermore, with the gasket part 46 being formed in a hook shape, the movement of the excessive portion due to thermal expansion to the fixing part 32 side is suppressed, and back leakage between the body 12 and the seat retainer 13 is also prevented.

Between the fixing part 32 and the seat retainer 13, a gap not depicted is provided. With this gap, the excessive region of the seat ring main body 20 by thermal expansion is absorbable. When the outer diameter side thermally expands more than the fixing part 32 due to an increase in temperature, this expanded portion is absorbed by escaping to the gap. With this, an abrupt increase of the crush margin due to expansion of the seat ring main body 20 is prevented, and stable sealability can be maintained with respect to temperature changes.

Figure 9:
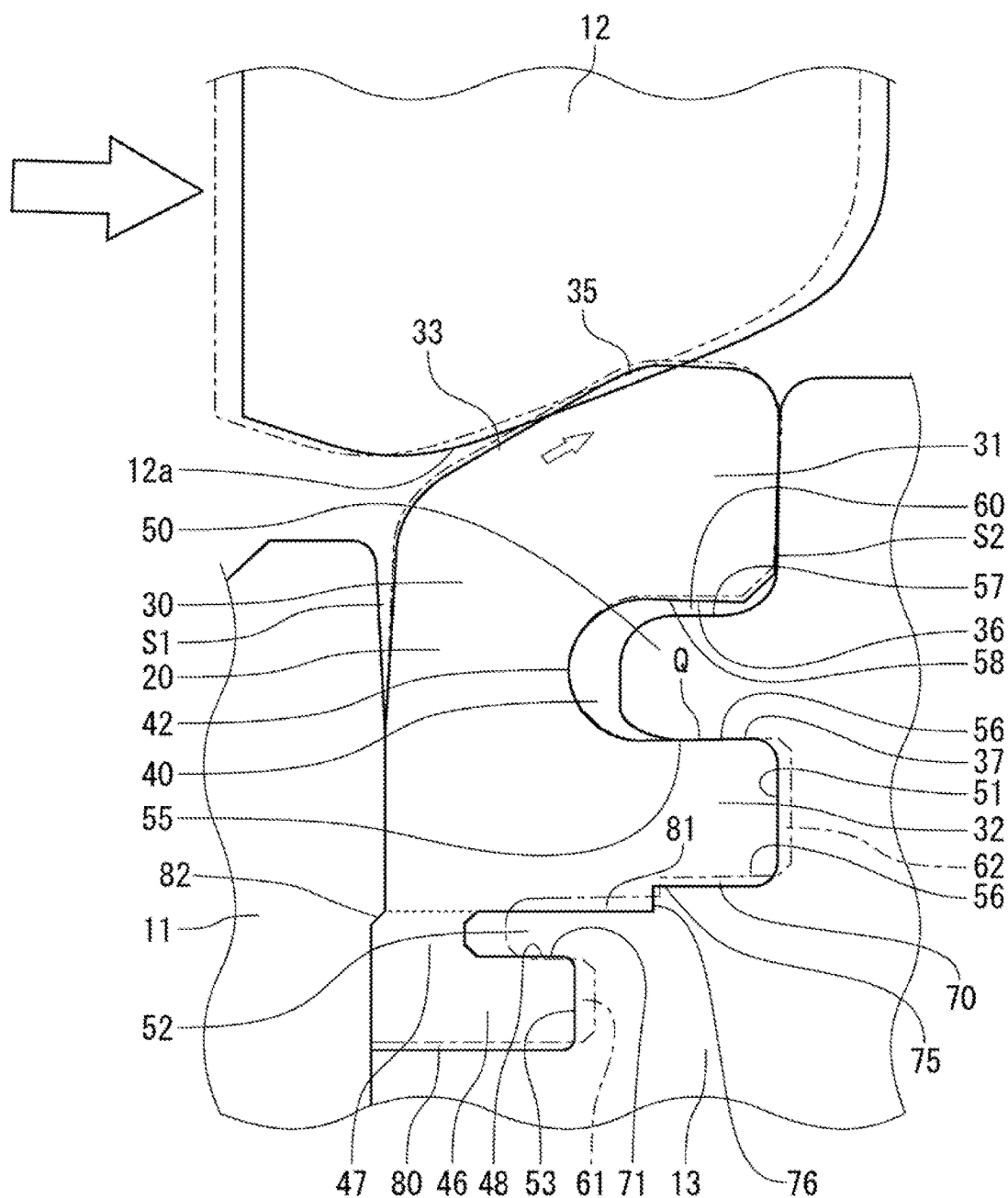
FIG. 9 is an enlarged schematic diagram of main parts depicting another embodiment of the eccentric-type butterfly valve.

In FIG. 9, another embodiment of the eccentric-type butterfly valve is depicted. Note in this embodiment onward that a portion identical to that of the above-described embodiment is represented by the same reference character and description of that portion is omitted.

When the butterfly valve is used with counter pressure, with the movement of the disc 12, a force to an extracting direction indicated by an arrow is applied to the seat part (a portion near the base body part 30 and the flexible part 31) of the seat ring main body 20. With this, the seat ring main body 20 is tilted to a seat retainer 13 side, and therefore a leakage of the fluid may occur between the seat ring main body 20 and the body 11, that is, so-called "back leakage", may occur. This phenomenon tends to occur at a relatively large diameter, such as a nominal diameter of 250 A or 300 A, of the valve.

To prevent this back leakage, in the present embodiment, as depicted in FIG. 9, while movement of the gasket part 46 is prevented by taking the thin thickness part 47 as a locally-pressed region, a body step part 82 is provided to the side surface of the body 11 where the thin thickness part 47 abuts.

With this body step part 82, the thin thickness part 47 is engaged. Therefore, by using the local pressure (compression ratio) of the thin thickness part 47, movement of the gasket part 46 can be prevented.

In this case, with arrangement of the body step part 82, if the entire thin thickness part 47 is shifted to a body 11 side, the local pressure of the thin thickness part 47 is not changed.

Also, while the body step part 82 is provided in a recessed shape on the side surface of the body 11 in the present embodiment, the body step part 82 may be provided in a convex shape from the side surface of the body 11.

Note that since the thin thickness part 47 engaged to the body step part 82 has a seal surface pressure with the body 11 increased in the engaged area, "back leakage" can be effectively prevented.

Figure 5:
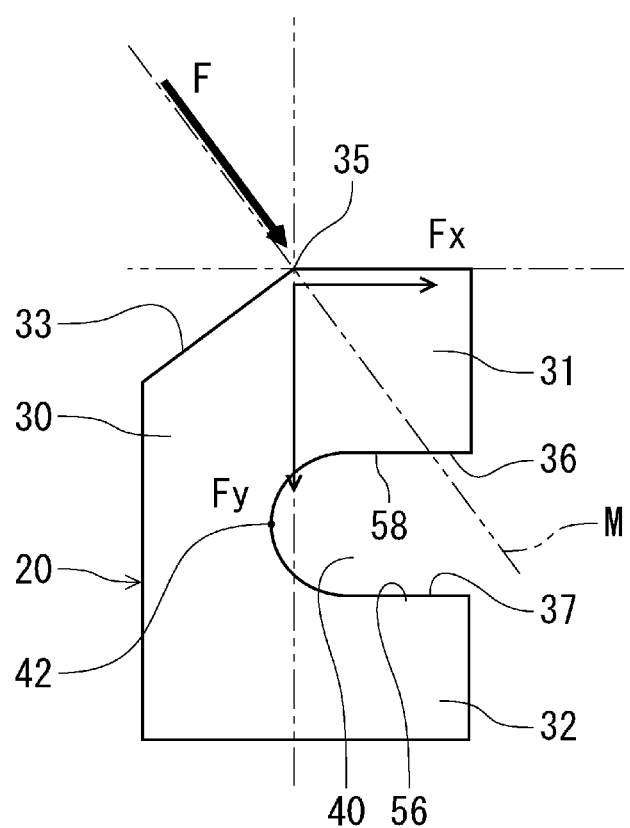
FIG. 5 is a schematic diagram depicting a force applied from a valve body to the seat ring.

Here, the mechanism of the butterfly-valve seat ring in the present invention is described by using a schematic diagram of the seat ring of the present invention depicted in FIG. 5. In a state in which the fluid pressure is 0 MPa, that is, a fluid pressure is not applied, a seal surface pressure to the seal contact part 35 occurs in a normal line M of the valve body seal surface 12a depicted in FIG. 2, and the flexible part 31 maintains a state of being deformed as being slightly tilted to the seat retainer 13 side, in a state in which the fixing part 32 is supported by the supporting point part Q depicted in FIG. 2.

Here, when a seal surface pressure F applied to a part of the seal contact part 35 is broken into a component of force Fy passing through its power point and perpendicular to the flow path 25 direction and a component of force Fx parallel to the flow path 25 direction, since the seal contact part 35 is positioned on the inner circumferential surface of the flexible part 31 on the seat retainer 13 side rather than the depth-side position of the space part 40, as depicted in the schematic diagram of FIG. 5, the component of force Fy acts to a direction of passing through the space part 40 (approaching the space part 40).

Thus, the force that is about to be applied from the disc 12 to the flexible part 31 can be caused to escape to a space part 40 side, the flexible part 31 is made so as to be able to warp easily, and the load on the seat ring main body 20 can be reduced. With this, while sealability is increased by a predetermined seal surface pressure, the load on the flexible part 31 side can be reduced to improve durability. By preventing abrasion, high sealability is ensured, and operability with low torque property can be exerted.

Thus, even if a fluid pressure is not applied, from the seat ring according to the present invention, sealing can be immediately made if a predetermined low seal surface pressure is caused to occur and a fluid pressure is applied. Note that while the seal surface force F at one point on the seal contact part 35 is depicted in the present embodiment, this seal surface pressure F covers the entire seal width by the seal contact part 35.

Subsequently, the operation in the embodiment of the above-described eccentric-type butterfly valve is described together with the mechanism of the butterfly valve seat ring in the present invention by using a graph depicting a relation between fluid pressure and seal surface pressure depicted in FIG. 4. Note that in FIG. 4 depicts that, for convenience of description, the fluid pressure is higher as going to the left side of the drawing in the case of positive pressure and fluid pressure is higher as going to the right side of the drawing in the case of counter pressure, with central 0 MPa taken as a center.

(1) First, when a fluid pressure is not applied, that is, when the fluid pressure is 0 MPa, if the disc 12 is rotated to be in a full closed state after the seat retainer 13 is attached, as indicated by the solid lines in FIG. 2, the valve body seal surface 12a of the disc 12 presses the seal contact part 35 of the flexible part 31, and the flexible part 31 is slightly deformed so as to be tilted to the seat retainer 13 side, in a state in which the fixing part is supported by the supporting point part Q. In more detail, in a state in which the disc 12 makes contact with the seat ring main body 20 to move to the body 11 side (left side in FIG. 2) by a clearance between the shaft insertion part 22 for stem insertion of the body 11 and the stem 21, that is, by a clearance around the shaft, the valve body seal surface 12a presses the seal contact part 35 of the flexible part 31.

When the disc 12 becomes in a full closed state, the flexible part 31 is deformed between the gaps S1 and S2 and the separate part 60, and becomes in a state of abutting on the seat retainer 13. With this deformation of the flexible part 31, warpage occurs to the base body part 30 of the seat ring main body 20. With this warpage, the flexible part 31 is in close contact with the disc 12 with a predetermined seal surface pressure, thereby exerting sealability at low pressure. Also, with the flexible part 31 abutting on the seat retainer 13, its counter force increases the seal surface pressure to enhance sealability.

Figure 4:
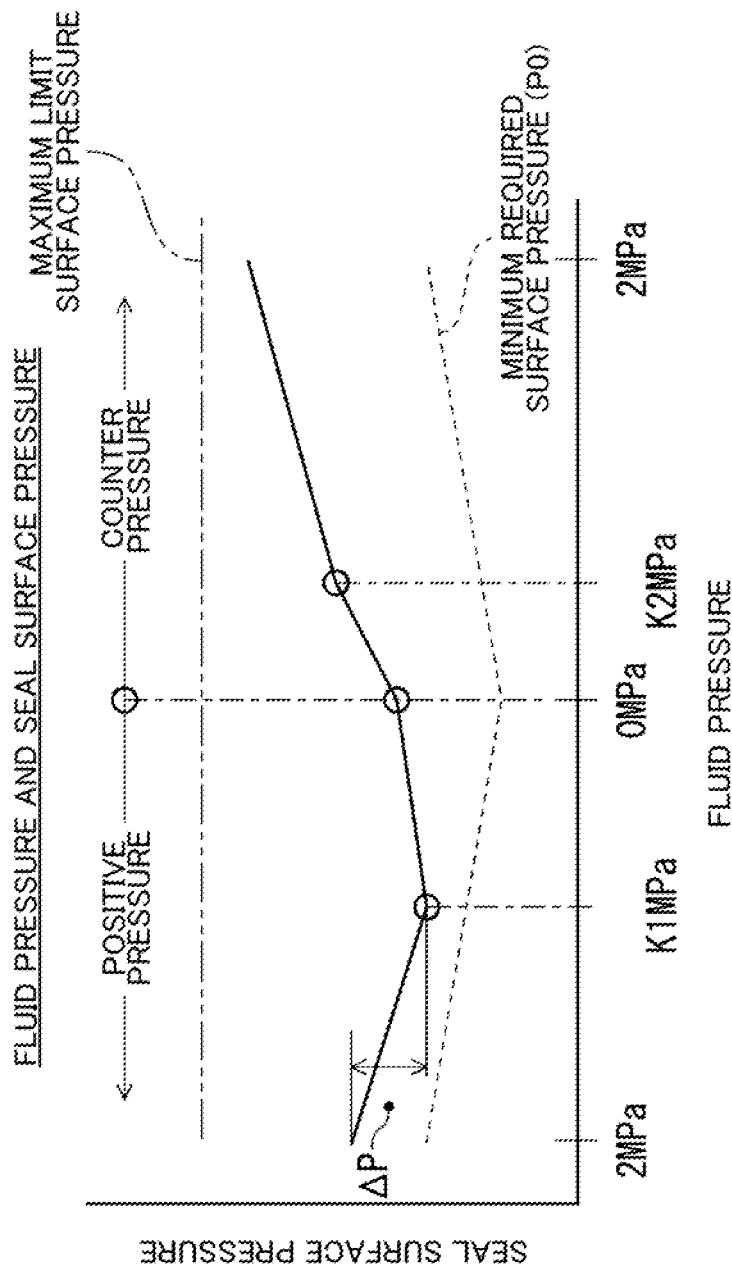
FIG. 4 is a graph depicting a relation between fluid pressure and seal surface pressure.

Note that the seal surface pressure at 0 MPa in FIG. 4 indicates a total value of a seal surface pressure a occurring by the above-described warpage and a seal surface pressure b occurring by the counter force because the flexible part 31 abuts on the seat retainer 13.

(2) Next, a state is described for each of the case of high pressure and the case of low pressure, the state in which a positive pressure is applied to the disc 12 in a valve closed state from the upstream side to the downstream side, that is, from the seat retainer 13 side to the body 11 direction. First, when the fluid pressure depicted in FIG. 4 is in a range of 0 MPa to K1 MPa, that is, in the case of low pressure, movement by the fluid pressure is directed to the downstream side (left side). With this, as indicated by two-dot-chain lines in FIG. 6, the seat ring main body 20 slightly moves to the downstream side while maintaining the state in which its flexible part 31 abuts on the seat retainer 13. Therefore, warpage of the base body part 30 of the seat ring main body 20 and the counter force due to abutment of the flexible part 31 on the seat retainer 13 are each slightly decreased, and thus the seal surface pressure between the disc 12 and the seat ring main body 20 is slightly decreased.

Here, K1 MPa is any pressure value (unit: MPa).

Figure 6:
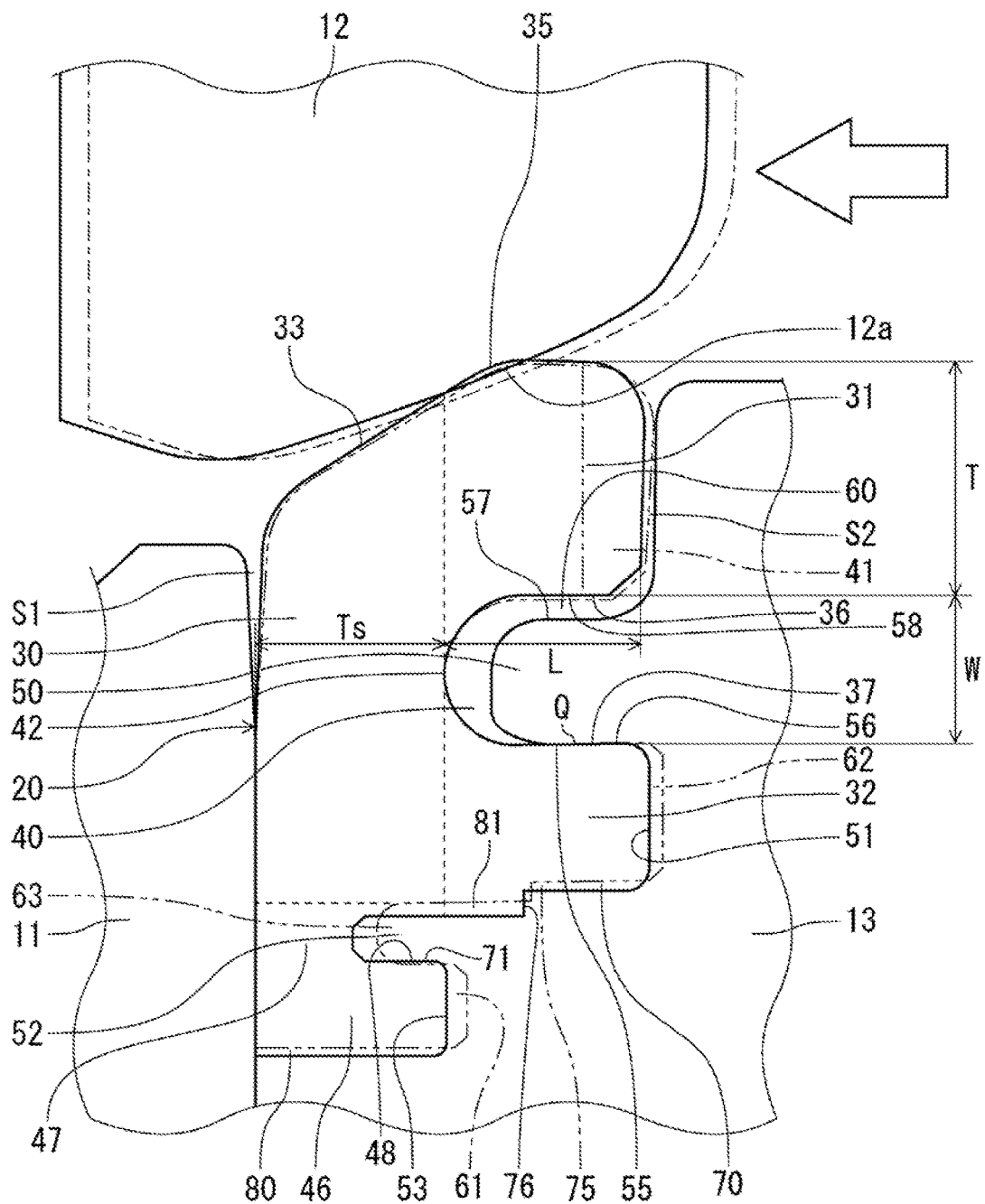
FIG. 6 is an enlarged schematic diagram depicting a state in which positive pressure is applied to the valve body of FIG. 2.

(3) Furthermore, when the fluid pressure depicted in FIG. 4 is in a range of K1 MPa to 2 MPa, that is, in the case of high pressure, in the seat ring main body 20, as indicated by solid lines in FIG. 6, in a state in which the supporting point part Q is supported by the protruding part 50, the flexible part 31 goes away from the seat retainer 13 to be tilted to the disc 12 side on the downstream side, and the seal contact part 35 strongly makes press contact with the valve body seal part 12a.

Here, since the fluid reaches the space part 40 via the groove part 41 and the gap S2, the seat ring main body 20 has the flexible part 31 side including the base body part 30 elastically deformed so as to be further tilted to the downstream side. With this so-called self seal function being exerted, as indicated by ΔP in FIG. 4, the seal surface pressure is effectively increased. Therefore, in addition to the valve body seal surface 12a moving to the downstream side, a decrease of the seal surface pressure using the warpage of the base body part 30 and the counter force by abutment on the seat retainer 13 is supplemented by the self seal function using the fluid pressure, thereby allowing seal surface pressure to be improved to ensure excellent sealability.

Note that, as depicted in FIG. 6, the gap S1 is secured between the base body part 30 and the body 11 side, and elastic deformation of the seat ring main body 20 to the downstream side is not inhibited.

More specifically, when the flexible part 31 abuts on the disc 12, on a vertical section of the seat ring main body 20 in the flow path direction, an intersection point N of a line segment V obtained by extending the supporting point part Q and the body 11 serves as a supporting point as a center of "leverage" of the flexible part 31 when the positive fluid pressure is received. The flexible part 31 is deformed by taking this intersection point N as a center.

(4) Next, a state is described for each of the case of high pressure and the case of low pressure, the state in which a counter pressure is applied to the disc 12 in a valve closed state from the downstream side to the upstream side, that is, from the body 11 side to the seat retainer 13 direction. First, when the fluid pressure in FIG. 4 is in a range of 0 MPa to K2 MPa, that is, in the case of low pressure, the disc 12 is moved by the fluid pressure to the upstream side by a clearance about the shaft. With this, in the seat ring main body 20, as indicated by solid lines in FIG. 7, the flexible part 31 is tilted to slightly strongly abut on the seat retainer 13. Therefore, with an increase of the seal surface pressure b occurring by a counter force with the flexible part 31 abutting on the seat retainer 13, the seal surface pressure is significantly increased as depicted in FIG. 4.

Here, since the fluid on the upstream side exits from the space part 40 via the groove part 41, the flexible part 31 is easily deformed to the seat retainer 13 side.

Here, K2 MPa is any pressure value (unit: MPa).

Figure 7:
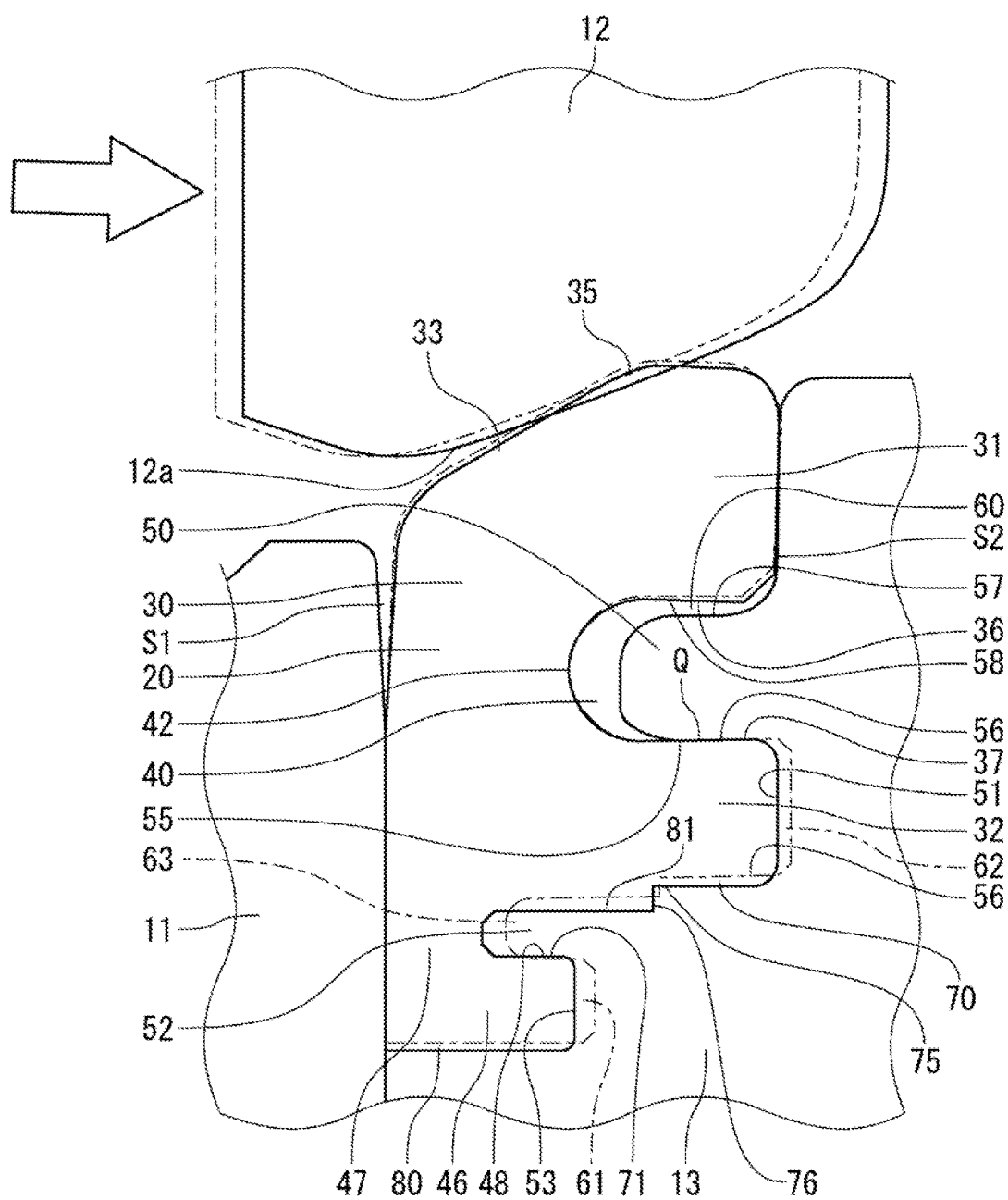
FIG. 7 is an enlarged schematic diagram depicting a state in which counter pressure is applied to the valve body of FIG. 2.

(5) Still further, when the fluid pressure depicted in FIG. 4 is in a range of K2 MPa to 2 MPa, that is, in the case of high pressure, the seat ring main body 20 becomes in a state of further strongly abutting on the seat retainer 13 from the state indicated by the solid lines in FIG. 7. Note that, in this case of high pressure, since the state is such that a clearance about the shaft has already disappeared, the amount of movement of the disc 12 to the upstream side stays at an amount due to warpage of the stem 21 to the upstream side. Therefore, an increase of the seal surface pressure is smaller than that in the case of low pressure.

As described above, with the flexible part 31 abutting on the seat retainer 13 except at the time of high pressure of positive pressure, an increase in internal stress of the base body part 30 of the seat ring main body 20 is prevented. With this, spring properties (elasticity) of the material (PTFE) itself configuring the seat ring main body 20 can be maintained, thereby improving sealability. With this operation, at the time of counter pressure, the surface pressure force is increased while resiliency is retained without depending on the stiffness of the seat ring main body 20 itself in an entire pressure area. As a result, durability can be maintained over a long period of time.

Also, with the outer surface 55 of the annular projection 50 in contact with the inside inner surface 56 of the space part 40, even if a heat change occurs to the valve main body 10, a change on a fixing part 32 side on an outer diameter side of the space part 40 can be suppressed so as to be approximately equal to a dimensional change of the metal-made seat retainer 13 in the radial direction.

On the other hand, with the flexible part 31 side being flexible in a state in which the position on the inner diameter side of the fixing part 32 is supported by the supporting point part Q, an amount of expansion is suppressed to a certain amount. While a state of exposure to the flow path 25 side is set to be slight, the dimensions are changed with the coefficient of linear expansion unique to resin to decrease the deformation amount of the crush margin. Therefore, abrasion of the flexible part 31 is suppressed to exert stable sealability.

Figure 8:
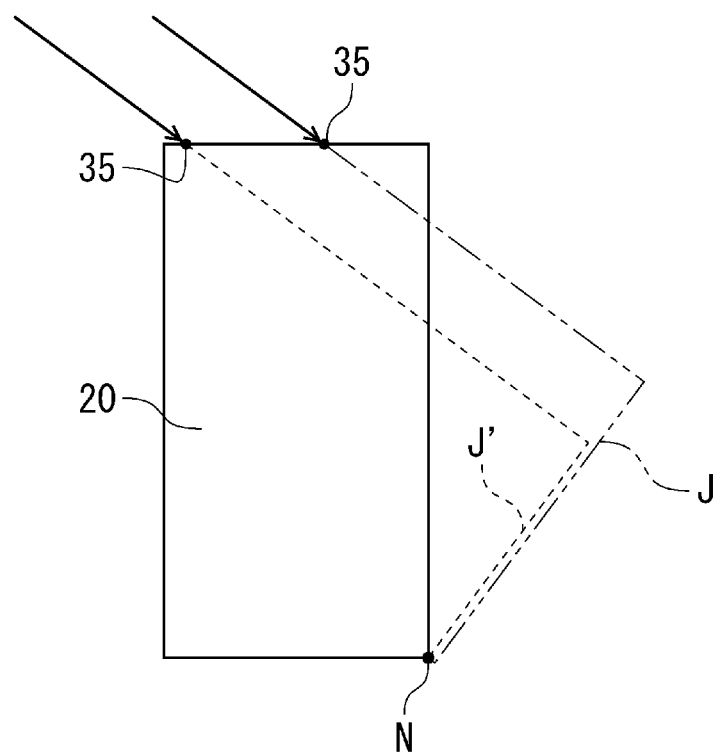
FIG. 8 is a schematic diagram of a general outline of the seat ring.

With the seal contact part 35 provided on the seat retainer 13 side rather than the depth-side position of the space part 40, as depicted in FIG. 8, an arm length J from the seal contact part 35 to the intersection point N is longer than an arm length J' from the seal contact part 35 when positioned closer to a secondary side to the intersection point N. With this, when a force is applied to the seal contact part (power point) 35, the seat ring main body 20 is fallen down by a small force, and higher sealability can be exerted with the same seal surface pressure. Since the flexible part 31 tends to easily warp, the seal surface pressure can be reduced, and durability is also improved.

In either case of positive pressure and counter pressure described above, the seal surface pressure F exerted by the seat ring main body 20 indicated by a solid line of FIG. 4 is equal to or larger than a minimum required surface pressure P0 required for sealing indicated by a broken line. To reliably satisfy this, by setting of the seat ring thickness Ts and an inner diameter D across the inside inner surface 56 of the space part 40, a radius of gyration Z can be provided so as to have an appropriate length to adjust the seal surface pressure. With this, the flow path 25 can be reliably sealed.

That is, when a force is applied from the seal contact part 35 to the flexible part 31, this flexible part 31 is deformed by the radius of gyration Z with a predetermined elastic force. Therefore, by regulating its deformation amount, while the minimum required surface pressure P0 indicated by the broken line in FIG. 4 and required for sealing between the valve body seal surface 12a and the seal contact part 35 and higher is ensured, both of positive pressure (a flow from the upstream side to the downstream side) and counter pressure (a flow from the downstream side to the upstream side) can be sealed. In this case, since physical property values are changed due to the material of the seat ring main body 20 and a temperature change of the valve main body 10, an optimum dimension is desirably provided as appropriate according to these.

In the eccentric-type butterfly valve of the present embodiment, provision is made so as to exert a predetermined seal surface pressure to support at least up to the fluid pressure of 2 MPa at the time of positive pressure and counter pressure.

Also, with the flexible part 31 and the fixing part extendedly provided to one surface side of the base body part 30 and with the space part 40 provided therebetween to configure the seat ring main body 20, the entire shape is simplified, and it is not required to perform complex processing on the body 11 side for attaching the seat ring main body 20. Therefore, simplification of the valve main body 10 as a whole is possible, and assembling is also easy.

Figure 10:
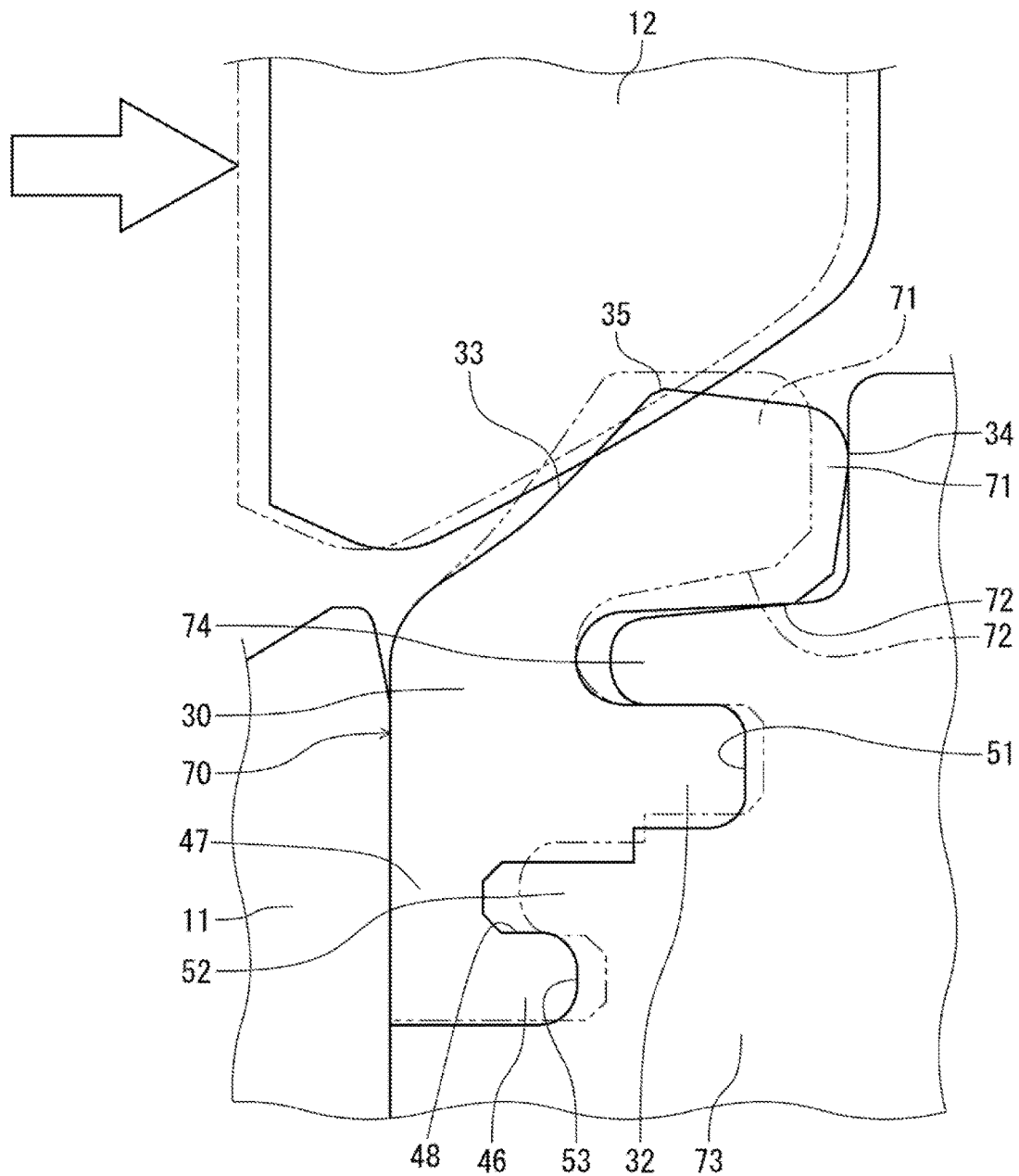
FIG. 10 is an enlarged schematic diagram of main parts depicting still another embodiment of the eccentric-type butterfly valve.
Figure 11:
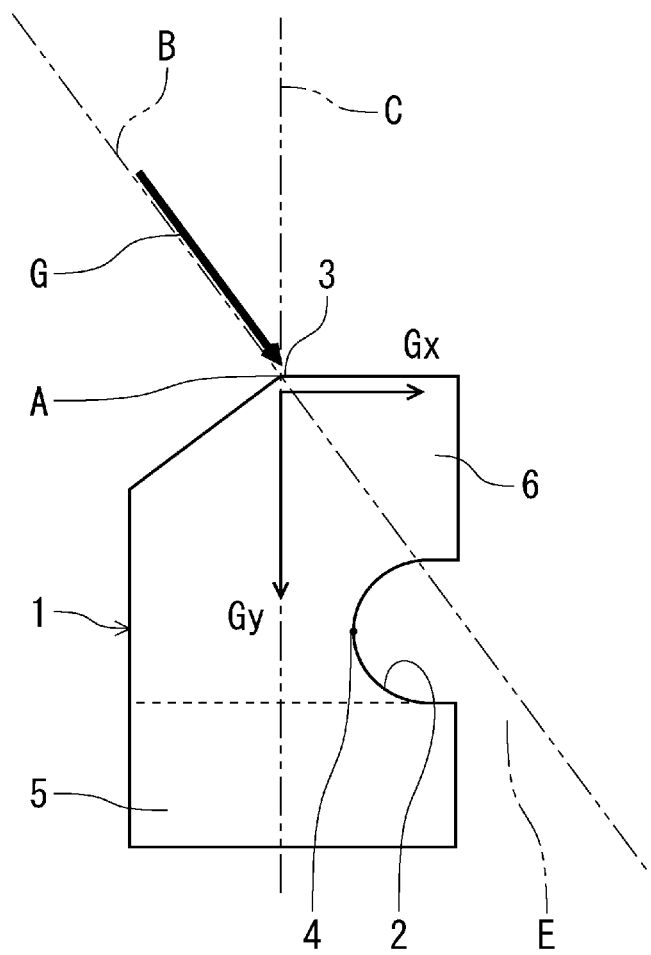
FIG. 11 is a schematic diagram depicting a seat ring of a conventional eccentric butterfly valve.

In FIG. 10, a still another embodiment of the eccentric-type butterfly valve is depicted.

When the nominal diameter of the valve is small, in view of securing a flow path, the thickness of the flexible part in the radial direction may not be sufficiently secured. In this case, only supporting the flexible part by the seat retainer may deform the flexible part to an outer diameter side to cause creep.

In this embodiment, in a valve with a small nominal diameter, when a counter fluid pressure is applied, as indicated by solid lines in FIG. 10, an outer circumferential surface 72 of a flexible part 71 of a seat ring main body 70 makes contact with an inner surface of an annular projection 74 of a seat retainer 73, thereby allowing suppression of deformation of the flexible part 71 to an outer circumferential side. With this, stable sealability can be ensured over a long period of time even with a thin thickness shape.

While the embodiments of the present invention have been described in detail in the foregoing, the present invention is not restricted to the description of the embodiments, and can be variously modified in a scope not deviating from the spirit of the invention described in the claims of the present invention.

REFERENCE SIGNS LIST 10 valve main body
11 body
12 disc
13 seat retainer
20 seat ring main body
21 stem
30 base body part
31 flexible part
32 fixing part
33 tapered surface
35 seal contact part
36 outer circumferential surface
37 inner circumferential surface
40 space part
42 depth part
45 fixing base part
50 annular projection
55 outer surface
56 inside inner surface
57 inner surface
58 outside inner surface
60 separate part
82 body step part
Q supporting point
S1, S2

The invention claimed is:

1. An eccentric-type butterfly valve comprising:
a cylindrical body having a flow path formed therein in a flow path direction;
a disc axially and rotatably supported via a stem in the cylindrical body;
an annular seat retainer; and
an annular seat ring fixed by the annular seat retainer in the cylindrical body, the annular seat ring including:
a ring-shaped base body part having a substantially rectangular shape in section,
a flexible part with a predetermined material thickness, the flexible part being integrally provided on one side surface of an inner diameter of the ring-shaped base body part so as to extend therefrom,
a fixing part being integrally provided on one side surface of an outer diameter of the ring-shaped base body part so as to extend therefrom, and
a gasket part disposed on an annular periphery of an outer circumferential surface side of the ring-shaped base body part, the gasket part being integrally coupled to the ring-shaped base body part via a thin thickness part,
wherein the disc is provided so as to be able to hermetically seal together with the annular seat ring,
the annular seat ring includes a recess defining a concentric space part which is provided between an outer circumferential surface of the flexible part and an inner circumferential surface of the fixing part,
an annular projection protrudes as a portion of the annular seat retainer at a position opposing the space part, the annular projection surrounding the entirety of the disc,
a recessed-shaped groove is formed on an outer diameter side of the annular projection,
a projecting part protrudes as a portion of the annular seat retainer and is disposed on an outer diameter side of the recessed-shaped groove,
an attachment recessed groove is disposed on an outer diameter side of the projecting part,
a seal contact part is provided to project at an inner diameter position of the flexible part, this seal contact part being positioned on an inner circumferential surface of the flexible part rather than a depth-side position of the space part,
the gasket part is configured so as to fill in the attachment recessed groove,
the fixing part is configured so as to fill in and be fixed in the recessed-shaped groove,
a fixing base part, configured by an exterior of the ring-shaped base body part and the fixing part, is attached so as to fit between the cylindrical body and the annular seat retainer,
a cylindrical body side of the fixing base part is in a close-contact seal state,
the flexible part is deformable so as to warp with respect to the fixing base part,
a first gap is formed between the ring-shaped base body part and the cylindrical body,
a second gap is provided between an end surface of the flexible part along a direction intersecting the direction of the flow path and a side surface of the annular seat retainer along a direction intersecting the direction of the flow path, the flexible part is deformable to a side of the cylindrical body where the first gap is disposed and the flexible part is deformable to a side of the annular seat retainer where the second gap is disposed, an outer surface of the annular projection and an inside inner surface of the space part are in contact with each other at a contact position defining a supporting point part via which the flexible part can warp.

2. The eccentric-type butterfly valve according to claim 1, wherein the annular projection is protruded before a depth part side of the space part to make the outer surface of the annular projection in contact with the inside inner surface of the space part, and a separate part is provided between the inner surface of the annular projection and an outside inner surface of the space part.

3. The eccentric-type butterfly valve according to claim 1, wherein a seal surface pressure between the seal contact part and the disc is increased at valve closing in a state in which the flexible part is supported as abutting on the annular seat retainer.

* * * * *